(12) United States Patent
Nelson et al.

(10) Patent No.: US 7,331,819 B2
(45) Date of Patent: Feb. 19, 2008

(54) MEDIA CONVERTER

(75) Inventors: Stephen T. Nelson, Cupertino, CA (US); Kishore Kamath, San Jose, CA (US); Atikem Haile-Mariam, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/382,457

(22) Filed: May 9, 2006

(65) Prior Publication Data

US 2007/0010132 A1 Jan. 11, 2007

Related U.S. Application Data

(60) Provisional application No. 60/698,114, filed on Jul. 11, 2005, provisional application No. 60/762,257, filed on Jan. 25, 2006.

(51) Int. Cl.
*H01R 33/945* (2006.01)

(52) U.S. Cl. .......................... 439/577; 385/88; 439/623

(58) Field of Classification Search ................ 439/577, 439/623; 385/73, 75, 53, 55, 88, 85, 89, 385/92
See application file for complete search history.

(56) References Cited

U.S. PATENT DOCUMENTS

| | | | |
|---|---|---|---|
| 4,902,092 A | 2/1990 | Grandy | |
| 5,104,243 A * | 4/1992 | Harding | 385/84 |
| 5,337,398 A | 8/1994 | Benzoni et al. | |
| 5,497,187 A | 3/1996 | Banker et al. | |
| 5,515,467 A | 5/1996 | Webb | |
| 5,561,727 A * | 10/1996 | Akita et al. | 385/88 |
| 5,631,988 A | 5/1997 | Swirhun et al. | |
| 5,668,419 A | 9/1997 | Oktay | |
| 6,036,654 A | 3/2000 | Quinn et al. | |
| 6,179,627 B1 * | 1/2001 | Daly et al. | 439/76.1 |
| 6,203,333 B1 * | 3/2001 | Medina et al. | 439/76.1 |
| 6,217,231 B1 | 4/2001 | Mesaki et al. | |
| 6,220,873 B1 * | 4/2001 | Samela et al. | 439/76.1 |
| 6,267,606 B1 * | 7/2001 | Poplawski et al. | 439/92 |
| 6,364,535 B1 * | 4/2002 | Coffey | 385/53 |
| 6,446,867 B1 | 9/2002 | Sanchez | |
| 6,458,619 B1 | 10/2002 | Irissou | |
| 6,478,625 B2 * | 11/2002 | Tolmie et al. | 439/608 |
| 6,565,384 B2 * | 5/2003 | Stricot et al. | 439/577 |
| 6,607,307 B2 * | 8/2003 | Gilliland et al. | 385/88 |

(Continued)

OTHER PUBLICATIONS

ADC Telecommunication, Inc., *100Base-TX-FX Wall-Mount Media Converter Installation Guide*, ADCP-92-036, Issue 1, Mar. 2002, brochure.

(Continued)

*Primary Examiner*—Neil Abrams
*Assistant Examiner*—Vladimir Imas
(74) *Attorney, Agent, or Firm*—Workman Nydegger

(57) ABSTRACT

Media converters for use in optical-to-electrical and electrical-to-optical conversion. A media converter includes an outer housing, an electrical plug disposed on one end of the outer housing, an optical cable disposed on an opposite end of the outer housing, and circuitry that connects to both the electrical plug and the optical cable. In this example, the circuitry receives electrical signals from the electrical plug and outputs corresponding optical signals to the optical cable. In addition, the circuitry also receives optical signals from the optical cable and outputs corresponding electrical signals to the electrical plug.

36 Claims, 15 Drawing Sheets

U.S. PATENT DOCUMENTS

| | | | |
|---|---|---|---|
| 6,755,575 B2* | 6/2004 | Kronlund et al. | 385/73 |
| 6,758,693 B2* | 7/2004 | Inagaki et al. | 439/577 |
| 6,774,348 B2 | 8/2004 | Guenter et al. | |
| 6,793,539 B1* | 9/2004 | Lee et al. | 439/701 |
| 6,794,577 B1* | 9/2004 | Bhogal | 174/74 R |
| 6,854,895 B2* | 2/2005 | Coffey et al. | 385/53 |
| 6,941,395 B1 | 9/2005 | Galang et al. | |
| 6,952,395 B1 | 10/2005 | Manoharan et al. | |
| 6,965,722 B1 | 11/2005 | Nguyen | |
| 7,065,604 B2 | 6/2006 | Konda et al. | |
| 7,088,518 B2 | 8/2006 | Tatum et al. | |
| 7,162,130 B2 | 1/2007 | Castellani et al. | |
| 2001/0035994 A1 | 11/2001 | Agazzi et al. | |
| 2002/0044746 A1 | 4/2002 | Kronlund et al. | |
| 2002/0049879 A1 | 4/2002 | Eyer | |
| 2002/0063935 A1 | 5/2002 | Price et al. | |
| 2002/0149821 A1 | 10/2002 | Aronson et al. | |
| 2002/0160656 A1* | 10/2002 | Nishita | 439/577 |
| 2003/0034963 A1 | 2/2003 | Moon et al. | |
| 2003/0208779 A1 | 11/2003 | Green et al. | |
| 2003/0223756 A1 | 12/2003 | Tatum et al. | |
| 2004/0076119 A1 | 4/2004 | Aronson et al. | |
| 2004/0184746 A1 | 9/2004 | Chang et al. | |
| 2004/0208600 A1 | 10/2004 | Guenter et al. | |
| 2004/0263941 A1 | 12/2004 | Chen et al. | |
| 2005/0036746 A1 | 2/2005 | Scheibenreif et al. | |
| 2005/0053340 A1 | 3/2005 | Toriumi et al. | |
| 2005/0063707 A1 | 3/2005 | Imai | |
| 2005/0063711 A1 | 3/2005 | Rossi et al. | |
| 2005/0078916 A1 | 4/2005 | Hosking | |
| 2005/0105910 A1 | 5/2005 | Light | |
| 2005/0105915 A1 | 5/2005 | Light | |
| 2005/0180700 A1 | 8/2005 | Farr | |
| 2005/0238358 A1 | 10/2005 | Light | |
| 2005/0286593 A1 | 12/2005 | Guenter | |
| 2006/0008276 A1 | 1/2006 | Sakai et al. | |
| 2006/0036788 A1 | 2/2006 | Galang et al. | |
| 2006/0045437 A1 | 3/2006 | Tatum et al. | |
| 2006/0049936 A1 | 3/2006 | Collins et al. | |
| 2006/0067690 A1 | 3/2006 | Tatum et al. | |
| 2006/0077778 A1 | 4/2006 | Tatum et al. | |
| 2006/0088251 A1 | 4/2006 | Wang et al. | |

OTHER PUBLICATIONS

"Fiber Optic Infrastructure," © 2000 by Extreme Networks, Inc.

"Optical DVI—HDCP Extension Cable," by Opticis, dated Aug. 27, 2003.

Caruso, Jeff; "Bandwidth Boom: Making The Connection, Can Fiber Break Through the Glass Ceiling?" Jul. 13, 1998 [retrieved on Apr. 25, 2005]. (Web page; 3 pages). http://www.internetweek.com/supp/bandwidth/canfiber.htm.

Opticis; "Optical DV1 Extension Module" © 2005 [retrieved on Apr. 25, 2005]. (Web page; 2 pages). http://www.opticis.com/products_2.htm.

Kanellos, Michael; "Intel Gets Optical With Fibre" Mar. 1, 2004 [retrieved on Apr. 26, 2005]. (Web page; 2 pages). http://news.zdnet.co.uk/0,39020330,39147918,00.htm.

Kanellos, Michael; "Intel Connects Chips With Optical Fiber" Feb. 27, 2004 [retrieved on Apr. 26, 2005]. (Web page; 5 pages). http://news.zdnet.com/2100-9574_22-5166883.html.

"Sandia Develops Vertical Cavity Surface Emitting Laser that Promises to Reduce Cost of Fiber Optics Connections," Sandia National Laboratories, Jun. 6, 2000, (Web page; 3 pages). http://www.sandia.gove/media/NewsRel/NR2000/laser.htm.

"Full-Scale Entry of Optical Transmission System Business Begins as Fujifilm Introduces Optical DVI Link System That Utilizes Lumistar, A Graded Index Plastic Optical Fiber—Realizes World's First 30M-Class High-speed Optical Linking of Digital Images Using a Plastic Optical Fiber"; Sep. 8, 2004, (Web Page; 3 pages). http://www.fujifilm.com/news/n040908.html (3 pages).

"Optical DVI (Digital Visual Interface) Link System" (Picture Image, 1 page). First date of publication unknown.

"DVI Extender Extend a single link digital DVI display up to 4,950 feet (1,500 meters). Also known as: DVI Optical Extension, DVI-D extender, DVI digital to multimode fiber, optical extender, graphic extension modules, fiber optic digital video extender"; (Web Page; 2 pages). Date of first publication unknown. http://www.networktechinc.com/dvi-optical-extender.html.

"DVI and HDMI extension, CAT5 and Fiber Optic Perfect Extenders for your Projector, Plasma, LCD screen or HDTV"; (Web Page; 6 pages). Date of first publication unknown. http://www.ramelectronics.net/html/DVI_fiber_cables.html.

Inova Semiconductors, Application Note, GigaStar Digital Display Link, Interfacing Between GigaSTaR DDL and DVI/LVDS, Revision 1.0, 10 pages.

U.S. Appl. No. 11/402,106, filed Apr. 10, 2006; Active Optical Cable With Electrical Connector; Lewis B. Aronson et al.

U.S. Appl. No. 11/402,186, filed Apr. 10, 2006; Active Optical Cable Electrical Connector; Lewis B. Aronson et al.

U.S. Appl. No. 11/402,241, filed Apr. 10, 2006; Active Optical Cable Electrical Adaptor; Lewis B. Aronson et al.

U.S. Appl. No. 11/402,161, filed Apr. 10, 2006 Electrical-Optical Active Optical Cable; Lewis B. Aronson et al.

U.S. Appl. No. 11/401,802, filed Apr. 10, 2006; Active Optical Cable With Integrated Power; Lewis B. Aronson et al.

U.S. Appl. No. 11/402,169, filed Apr. 10, 2006; Active Optical Cable With Integrated Retiming; Lewis B. Aronson et al.

U.S. Appl. No. 11/401,803, filed Apr. 10, 2006; Active Optical Cable With Integrated Eye Safety; Lewis B. Aronson.

U.S. Appl. No. 11/468,280, filed Aug. 28, 2006; Optical Networks for Consumer Electronics; Jimmy A. Tatum et al.

U.S. Appl. No. 11/470,623, filed Sep. 6, 2006; Laser Drivers for Closed Path Optical Cables; Jim A. Tatum et al.

* cited by examiner

MEDIA CONVERTER

CROSS-REFERENCE TO RELATED APPLICATIONS

This application claims the benefit of U.S. Provisional Patent Application No. 60/698,114 entitled "Optical Transceiver and Link System For Use In Storage Area Networks" filed Jul. 11, 2005, and the benefit of U.S. Provisional Patent Application No. 60/762,257 titled "Media Converter" filed Jan. 25, 2006, which applications are hereby incorporated by reference.

BACKGROUND OF THE INVENTION

1. The Field of the Invention

The present invention relates to media conversion. More particularly, embodiments of the invention relate to media converters that can be used in optical-to-electrical and electrical-to-optical conversion.

2. The Relevant Technology

Many modern computer communications networks employ cabling over which data signals can be transmitted. Two common types of cabling are fiber cabling used to transmit optical signals and copper cabling used to transmit electrical signals. Although fiber cabling offers several advantages over copper cabling, the ubiquitous use of copper cabling makes wholesale conversion from copper cabling to fiber cabling costly and impractical. Instead, many network administrators choose instead to take a piecemeal transition to an all-optical network. A piecemeal transition requires the ability to connect different network elements and infrastructure within a highly integrated and optimized environment.

A media converter works at the physical network layer to connect two different media types, such as copper cabling and fiber cabling. Media converters are devices that take an incoming data signal from one type of media and convert it for transmission onto another type of media, for example, 100Base-TX (copper) to 100Base-FX (fiber). Since media converters function at the physical network layer, media converters do not interfere with higher layer functions, making the whole conversion process transparent to switches and routers, and the end user. Media converters can be used in a network that employs both copper and fiber cabling to converge the copper and fiber cabling without affecting network functionality.

One problem with current media converters configured to convert between copper and fiber cabling is they often have a large and bulky form factor. This large and bulky form factor can create space and clutter issues in applications where many copper-to-fiber or fiber-to-copper conversion points are arranged in close proximity to each other. Conventional media converters configured to convert between copper and fiber cabling are often unmounted and can be easily misplaced because they are not easily affixed in a permanent location. Further, current media converters often require an external power supply in order to function and often do not support conversion between copper and fiber cabling at gigabit speeds.

BRIEF SUMMARY OF THE INVENTION

These and other limitations are overcome by embodiments of the invention, which relate to systems and methods for providing optical-to-electrical and electrical-to-optical conversion. The various exemplary embodiments are designed to facilitate the replacement of electrical cabling with optical cabling within a computer network or to facilitate the use of optical cabling with existing electrical cabling. Exemplary embodiments of the invention enable the replacement of copper electrical cabling with fiber optical cabling in a computer network without necessitating a change in the conventional hardware configuration of the computer network.

In one example, a media converter includes an outer housing, an electrical plug disposed on one end of the outer housing, an optical cable disposed on an opposite end of the outer housing, and circuitry that connects to both the electrical plug and the optical cable. In this example, the circuitry receives electrical signals from the electrical plug and outputs corresponding optical signals to the optical cable. In addition, the circuitry also receives optical signals from the optical cable and outputs corresponding electrical signals to the electrical plug.

In another example, a media converter includes an outer housing, an electrical plug disposed on one end of the outer housing, an optical port disposed in an opposite end of the outer housing, and circuitry that connects to both the optical port and the electrical plug. In this example, the circuitry receives electrical signals from the electrical plug and outputs corresponding optical signals to the optical port. In addition, the circuitry also receives optical signals from the optical port and outputs corresponding electrical signals to the electrical plug.

In yet another example, a media converter includes an outer housing having a form factor configured to be at least partially disposed within a wall outlet box, an optical port disposed in the outer housing, a corresponding electrical jack disposed in the outer housing, and circuitry that connects to both the optical port and the electrical jack. In this example, the circuitry receives electrical signals from the electrical jack and outputs corresponding optical signals to the optical port. In addition, the circuitry also receives optical signals from the optical port and outputs corresponding electrical signals to the electrical jack.

Additional features of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Exemplary embodiments of the invention relate to media converters that can be used in optical-to-electrical and electrical-to-optical conversion. The principles of the present invention relate to various exemplary media converters for use in a computer network. The various exemplary embodiments are designed to facilitate the replacement of copper electrical cabling with fiber optical cabling within a computer network or to be used in conjunction with electrical cabling. Exemplary embodiments of the invention enable the replacement of electrical cabling with optical cabling without necessitating a change in the conventional hardware configuration of a computer network.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of network systems have not been described in great detail in order to avoid unnecessarily obscuring the present invention.

1. EXEMPLARY MEDIA CONVERTERS

Figure 1:
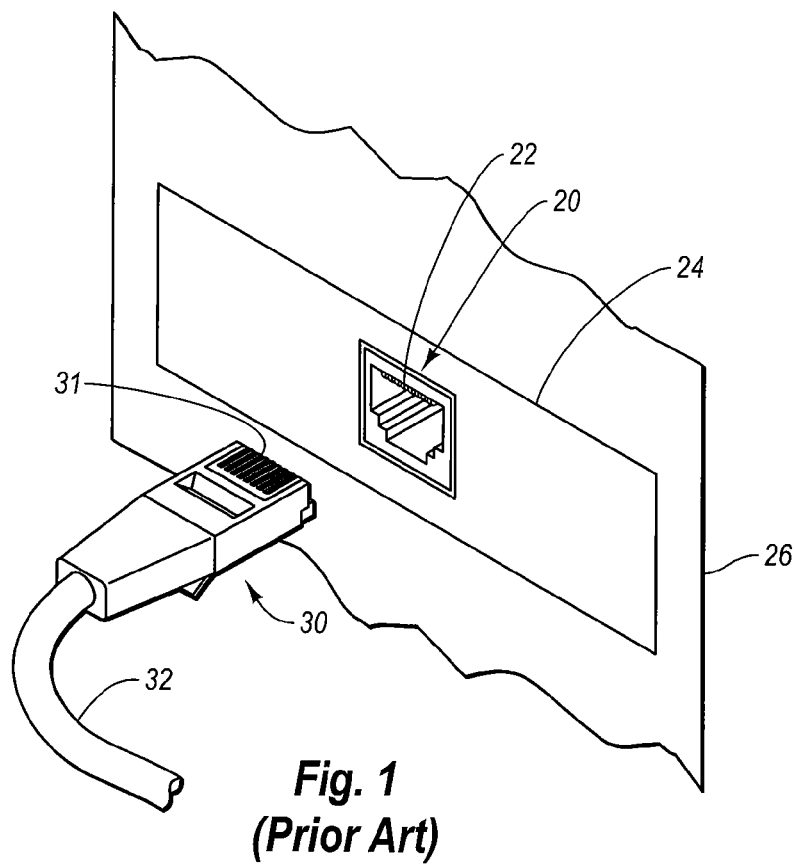
FIG. 1 illustrates a conventional electrical cable and an electrical jack of a network card in a computer.

FIG. 1 illustrates an electrical cable 32 which is to be connected into an electrical jack 20 of a network card 24 in a computer 26. The terms "electrical jack" and "electrical plug" as used herein refer to a jack or plug configured to send or receive electrical data signals. Examples of electrical jacks and electrical plugs include, but are not limited to, jacks and plugs compliant with registered jack ("RJ") standards such as RJ-11, RJ-14, RJ-25, RJ-48, RJ-61 and RJ-45 standards. The RJ-45 standard, for example, is commonly used in conjunction with an electrical cable. The term "electrical cable" as used herein refers to a cable configured to transmit electrical data signals. Examples of electrical cables include, but are not limited to, Category 5 ("CAT-5") cables, CAT-5e cables, and CAT-6 cables.

One end of electrical cable 32 is attached to an electrical plug 30. Electrical plug 30 includes a plurality of conductive pins 31 that are sized and configured to be electrically coupled to conductive pads 22 of electrical jack 20. Electrical plug 30 may click into place when it is inserted into electrical jack 20.

Figure 2:
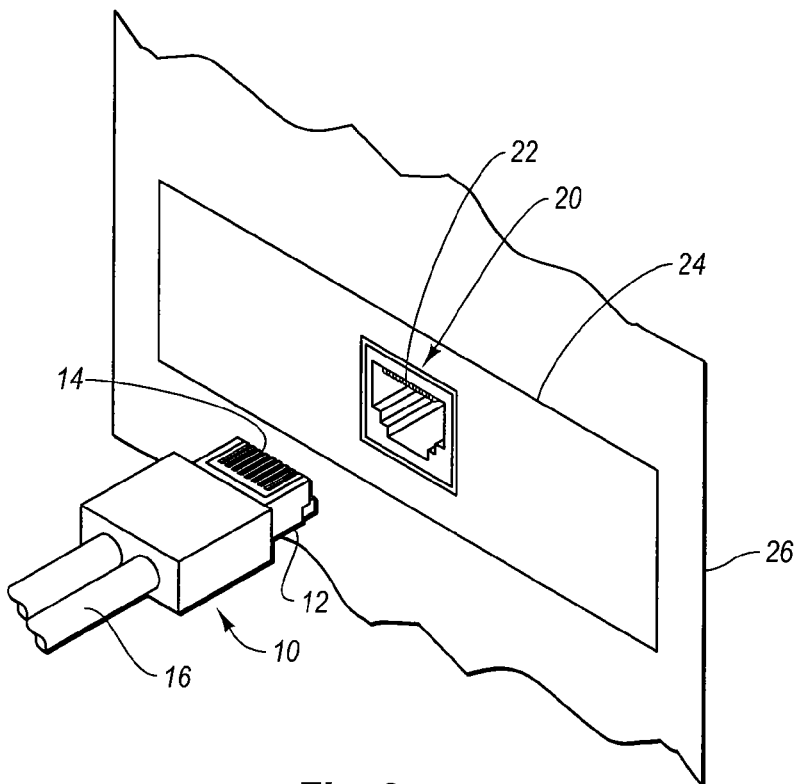
FIGS. 2, 3A, and 3B illustrate one exemplary embodiment of a media converter attached to an optical cable having a plug that is sized and configured to be received within an electrical jack.
Figure 3A:
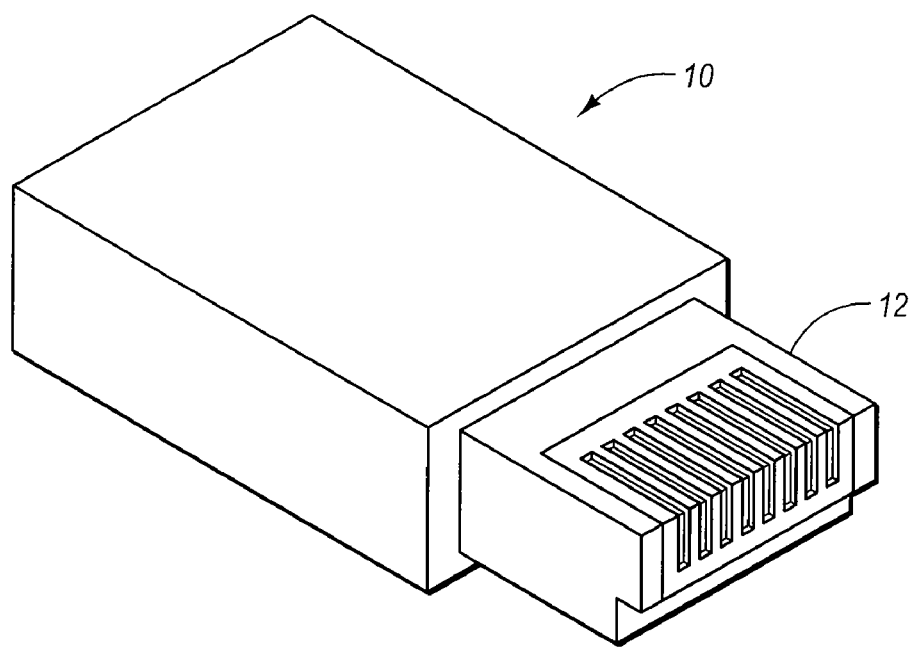
Figure 3B:
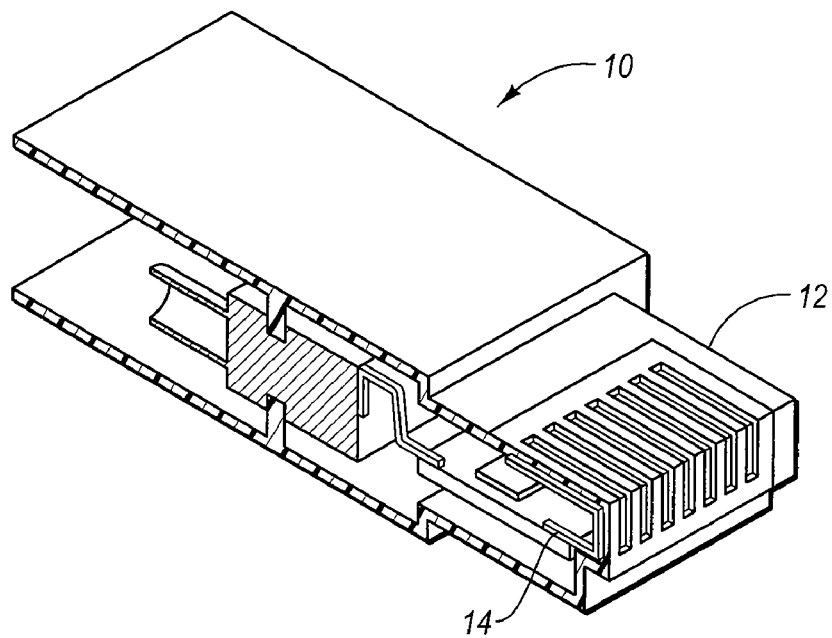

FIGS. 2, 3A and 3B illustrate an exemplary embodiment of a media converter 10. Media converter 10 includes an electrical plug 12 that is sized and configured to be received within an electrical jack, such as electrical jack 20. Similar to electrical plug 30 of FIG. 1, electrical plug 12 includes a plurality of conductive pins 14 that are sized and configured to be electrically coupled to conductive pads 22 of electrical jack 20. Also similar to electrical plug 30 of FIG. 1, electrical plug 12 may click into place when it is inserted into electrical jack 20.

Unlike electrical plug 30 of FIG. 1, however, media converter 10 of FIG. 2 is attached to an optical cable 16. The term "optical cable" as used herein refers to a cable configured to transmit optical data signals. Examples of optical cables include, but are not limited to, single mode fiber optic cables, multimode fiber optic cables, and plastic optical fiber ("POF") fiber optic cables. The term optical cable as used herein is not limited to a cable having a single optical transmission channel, but broadly encompasses a cable having one or more optical transmission channels. Optical data signals are transmitted through optical cables using light.

The form factor of media converter 10 allows media converter 10 to be plugged into electrical jack 20 without occupying substantially more space than did electrical plug 30. Specifically, the form factor of media converter 10 is configured such that the height and width of the outer housing of media converter 10 is not greater than the height and width of the outer housing of electrical jack 20. The form factor of media converter 10 allows media converter 10 to be used in applications where multiple electrical jacks are placed in close proximity horizontally or vertically. Thus, media converter 10 can be used in existing electrical jack applications having a high jack density.

Figure 4:
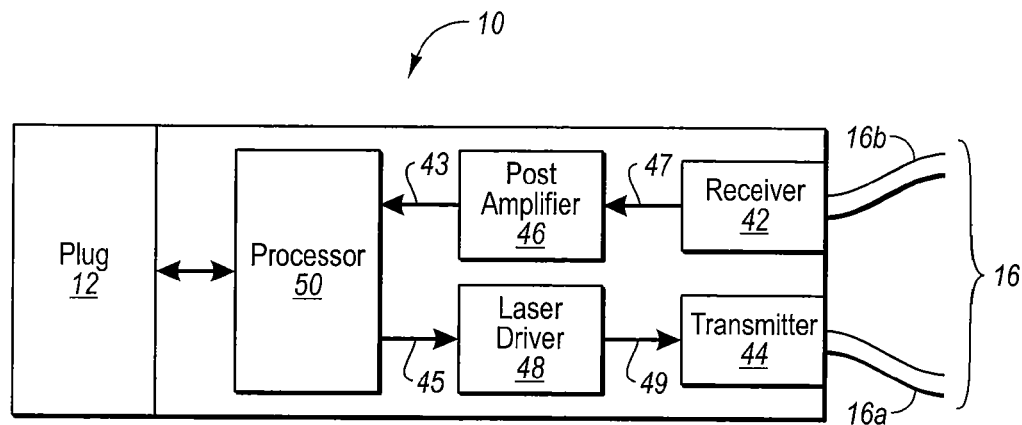
FIG. 4 illustrates a schematic diagram of an exemplary media converter.

FIG. 4 further illustrates the exemplary media converter 10 with a schematic diagram of one exemplary embodiment of the circuitry of media converter 10. As illustrated in FIG. 4, media converter 10 includes an optical receiver 42 and an optical transmitter 44.

Optical receiver 42 acts as an opto-electric transducer by transforming an optical signal into an electrical signal. Optical receivers are well known in the art and may include, by way of example and not limitation, photodiodes, such as avalanche photodiodes ("APDs"). Optical receiver 42, along with other electronic circuitry such as, for example, a post amplifier 46 and a processor 50, is configured to convert optical signals received from optical cable 16*b* into electrical signals. These electrical signals are then sent to conductive pins 14 of plug 12, as illustrated in FIG. 2. The electrical signals are then transferred from conductive pins 14 into conductive pads 22 of electrical jack 20, also as illustrated in FIG. 2.

Optical transmitters are also well known in the art and may include, by way of example only, light emitting devices such as VCSELs, LEDs, and the like. Optical transmitter 44, along with other electronic circuitry such as, for example, a laser driver 48 and processor 50, is configured to convert an electrical data into optical data signals for transmission into an optical cable 16*a*. The electrical data signals are originally received from conductive pads 22 of electrical jack 20 through conductive pins 14 of electrical plug 12, as illustrated in FIG. 2.

The exemplary media converter 10 also includes data processor 50 and may optionally include in some embodiments post amplifier 46 and laser driver 48. Post amplifier 46 and laser driver 48 are coupled between processor 50 and optical receiver 42 and transmitter 44, respectively. Post-amplifier 46 amplifies signals received from optical receiver 42, as represented by arrow 47, and relays the amplified signals to data processor 50, as represented by arrow 43. Laser driver 48 receives electrical signals from processor 50, as represented by arrow 45, and directs the transmitter 44, as represented by arrow 49, to emit optical signals corresponding to the electrical signals received from processor 50. Accordingly, the transmitter 44 serves as an electro-optic transducer.

As illustrated in FIG. 4, data processor 50 is electronically coupled to plug 12. More specifically, data processor 50 is electronically coupled to conductive pins 14 of plug 12, which are in turn electronically coupled to conductive pads 22 of electrical jack 20, as illustrated in FIG. 2. Data processor 50 is also coupled to both optical transmitter 44 and optical receiver 42. Data processor 50 may serve multiple functions. Most importantly, data processor 50 serves as the logical interface between optical cables 16*a* and 16*b* and conductive pins 14 and conductive pads 22.

When electrical jack 20 transmits and receives data, it often does so in a fairly complex manner. For example, nearly all Ethernet protocols at a minimum transmit both Transmit+ ("Tx+") and Transmit− ("Tx−") signals of opposite polarities, and receive both Receive+ ("Rx+") and Receive− ("Rx−") signals of opposite polarities. Some protocols may also transmit multiple data bits in parallel. Data processor 50 converts the signals transmitted by electrical jack 20 of FIG. 2 into a serial electric data stream for conversion into optical signals by optical transmitter 44. Similarly, data processor 50 receives serial electric data from the optical receiver 42, and converts the serial electric data into a protocol that is acceptable to electrical jack 20. The converted data is delivered to conductive pins 14 of plug 12, and thereafter is received by the electrical jack 20 through conductive pads 22, as illustrated in FIG. 2.

It is worth noting that processor 50 may be integrated into the same circuit or chip as optical transmitter 44 and optical receiver 42. Additionally, post amplifier 46 and laser driver 48 may also be integrated into the same circuit or chip as processor 50. In some embodiments, the operations of processor 50 may be limited to routing the transmitted signals from electrical jack 20 to optical transmitter 44 or laser driver 48, and routing the signals received from the optical receiver 42 or post amplifier 46 to electrical jack 20.

Figure 5A:
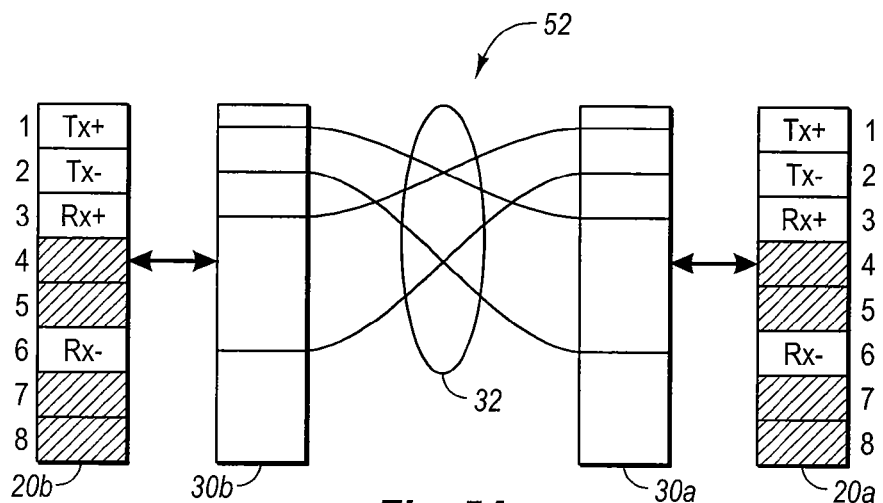
FIG. 5A illustrates a conventional interface for interconnecting a computer network.
Figure 6:
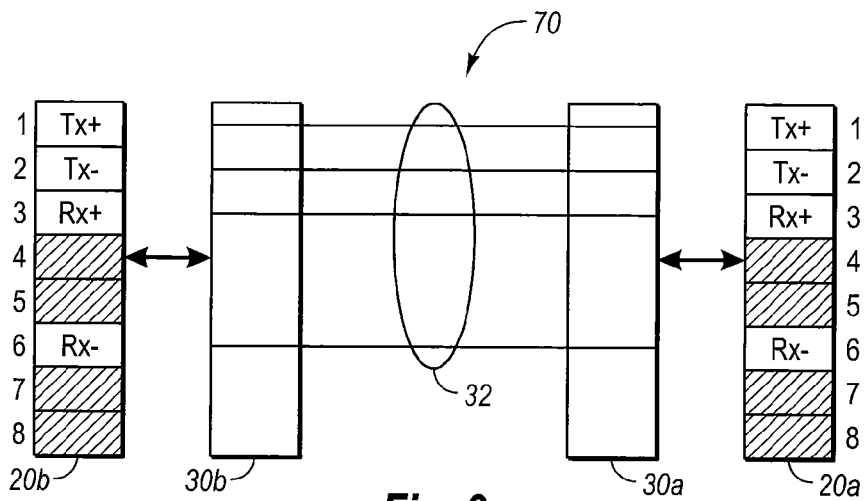
FIG. 6 illustrates a conventional 100Base-T straight interface for connecting two corresponding RJ-45 jacks.
Figure 7A:
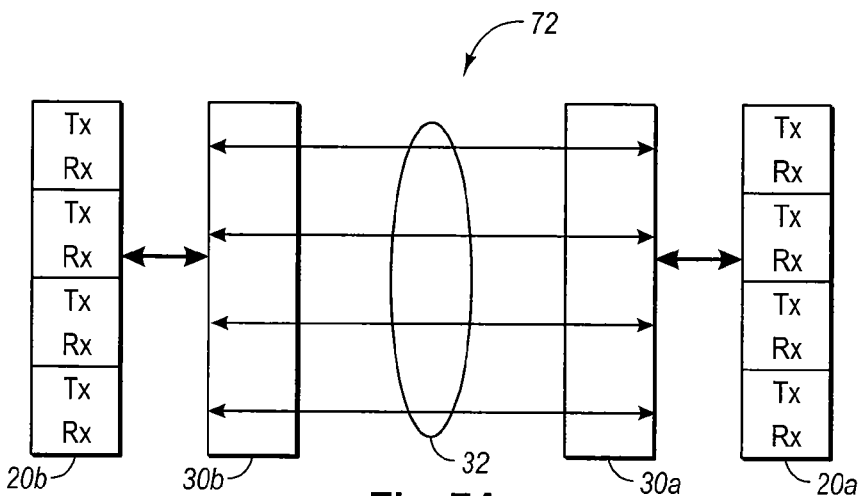
FIG. 7A illustrates a conventional 1000Base-T interface for connecting two corresponding RJ-45 jacks.

To further clarify the function of processor 50, FIGS. 5A, 6, and 7A are provided to illustrate various conventional interfaces that are currently used for interconnecting a computer network. These figures are provided by way of example only, and are not intended to limit the types of media converters that may be configured for interconnecting a computer network. FIG. 5A illustrates a conventional 100Base-T crossover interface 52 for connecting two corresponding RJ-45 jacks 20*a* and 20*b*. In a conventional network, an unshielded twisted pair ("UTP") cable 32 having electrical plugs 30*a* and 30*b* attached to both ends is connected to RJ-45 jacks 20*a* and 20*b*. The internal wiring of UTP cable 32 is configured for connecting the transmitted signals from one RJ-45 jack, for example RJ-45 jack 20*a*, to the appropriate conductive pads of another RJ-45 jack, for example RJ-45 jack 20*b*. For example, the UTP cable 32 connects pin 1 (Tx+) of RJ-45 jack 20*a* to pin 3 (Rx+) of RJ-45 jack 20*b*, and pin 2 (Tx−) of RJ-45 jack 20*a* to pin 6 (Rx−) of RJ-45 jack 20*b*.

Figure 5B:
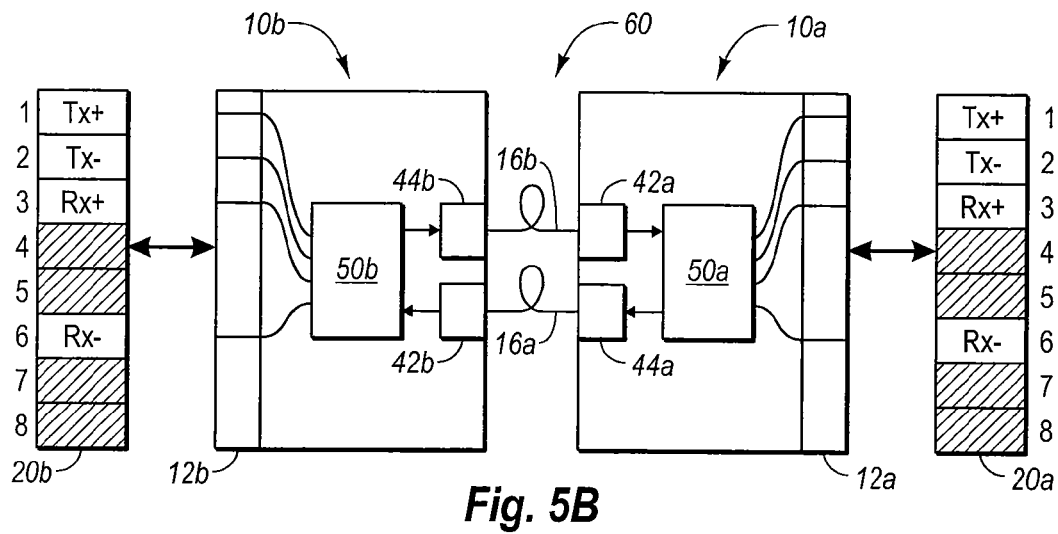
FIG. 5B illustrates an optical channel configured to replace an unshielded twisted pair cable.

One exemplary implementation of the present invention, as illustrated in FIG. 5B, provides an optical channel 60 configured to replace the UTP cable 32 of FIG. 5A. The optical channel 60 consists of two media converters 10*a* and 10*b* having plugs 12*a* and 12*b* that are coupled to RJ-45 jacks 20*a* and 20*b*, respectively. The relevant pins of plugs 12*a* and 12*b* are coupled to processors 50*a* and 50*b* of media converters 10*a* and 10*b*. Processors 50*a* and 50*b* convert the Tx+ signals and Tx− signals into serial electric data streams to be sent to optical transmitters 44*a* and 44*b*. Optical transmitters 44*a* and 44*b* convert the serial electric data streams into serial optical data streams for transmission on optical cables 16*a* and 16*b*, respectively. Likewise, media converters 10*a* and 10*b* may receive optical signals on optical cables 16*b* and 16*a*, respectively. When optical signals are received, the optical receivers 42*a* and 42*b* convert the optical signals into serial electric data streams for delivery to data processors 50*a* and 50*b*. Data processors 50*a* and 50*b* convert these signals into Rx+ and Rx− signals as required by the electrical jacks 20*a* and 20*b*.

FIG. 6 illustrates a conventional 100Base-T straight interface 70 for connecting two corresponding RJ-45 jacks 20*a* and 20*b*. This interface is similar to that of FIG. 5A, except that the network cable 32 of FIG. 6 does not require a crossover. The media converters of the present invention are also configurable to be used as a replacement for replacing the straight interface 70 that is shown in FIG. 6. This embodiment of the media converters (not shown) is similar to that of FIG. 5B, except that the crossover is not accounted for.

FIG. 7A illustrates a conventional 1000Base-T interface 72 for connecting two corresponding RJ-45 jacks 20*a* and 20*b*. This interface uses a 5-level (quinary) pulse amplitude modulation ("PAM5") to enable Gigabit Ethernet, achieving sustained data rates of 1 Gbit/s over four CAT-5 parallel differential signal lines 32, each operating at 125 MHz. The four CAT-5 lines 32 are represented by the lines coupled to the four Rx/Tx lines of the RJ-45 jacks 20*a* and 20*b*. In PAM5 encoding, each transmitted symbol represents one of five levels: generally −2, −1, 0, +1, +2. Four of the levels represent two bits of data each, thereby generating eight bit words between the four Rx/Tx lines. The fifth level supports forward error correction ("FEC") in the form of four-dimensional eight-state Trellis coding. The 1000Base-T physical layer achieves full-duplex transmission, allowing simultaneous symbol transmission and reception on each wire pair. Consequently, each wire pair attains 250-Mbits/s throughput using 125-Mbaud baseband signaling—achieving 1 Gbit/s rates at a spectral power density similar to that of 100Base-TX.

Figure 7B:
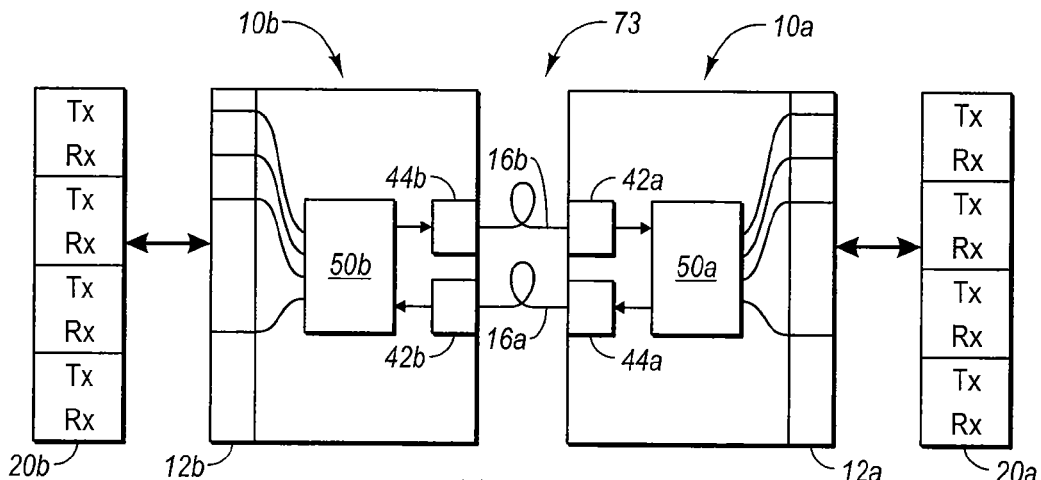
FIG. 7B illustrates an optical channel configured to replace the unshielded twisted pair cable in the 1000Base-T interface of FIG. 7A.

As illustrated in FIG. 7B, the present invention provides an optical channel 73 configured to replace the UTP cable 32 in the 1000Base-T interface of FIG. 7A. The optical channel 73 consists of two media converters 10a and 10b having plugs 12a and 12b that are coupled to RJ-45 jacks 20a and 20b, respectively. The conductive pins of plugs 12a and 12b are electrically coupled to processors 50a and 50b of media converters 10a and 10b, respectively. Processors 50a and 50b multiplex the four Tx signals being sent from each RJ-45 jack 20a and 20b to create a serial electric data stream to be sent to optical transmitters 44a and 44b, respectively. Processors 50a and 50b recognize which of the five voltage levels is being produced by each of the four Tx signals, and produces a two-bit serial data stream that corresponds to each PAM5 voltage level produced. Therefore, for each instance that the four Tx signals transmit a PAM5 signal, each processor produces an eight-bit serial stream of data representative of the four PAM5 signals. The serial streams of data are sent to optical transmitters 44a and 44b. Optical transmitters 44a and 44b convert the serial electric data streams into serial optical data streams for transmission on optical cables 16a and 16b, respectively. This conversion from electrical signals to optical signal is performed at gigabit speeds.

Likewise, media converters 10a and 10b may receive optical signals from optical cables 16b and 16a, respectively. When optical signals are received, the optical receivers 42a and 42b convert the optical signals into serial electric data streams for delivery to data processors 50a and 50b, respectively. Data processors 50a and 50b demultiplex these signals into the four Rx signals as required by electrical jacks 20a and 20b. To accomplish this, processors 50a and 50b read the serial electric data streams in two-bit intervals, and produce PAM5 voltage signals which are readable by the Rx pins of RJ-45 jacks 20a and 20b. This conversion from optical signals to electrical signal is performed at gigabit speeds.

In one exemplary embodiment of the invention, processors 50a and 50b of FIG. 7B are implemented with a chip similar to a physical layer chip ("PHY"), as is currently used in many 1000Base-T systems. The PHY chips are capable of converting serial data streams into PAM5 signals, and converting PAM5 signals into serial data streams. The resultant processor would thus be capable of performing the conversion between the PAM5 signals and the serial data steam, and performing all of the necessary steps to transmit and receive optical signals.

2. EXEMPLARY MEANS FOR SUPPLYING POWER TO A MEDIA CONVERTER

The present invention further provides for various means for supplying power to the exemplary media converters disclosed herein. Often media converter components, such as the processor, post amplifier, laser driver, optical transceiver, and/or optical receiver, require a power supply in order for these components to function over long periods of time. However, most conventional Ethernet protocols do not supply power through an RJ-45 jack to power a media converter. Therefore, exemplary embodiments of the invention provide for various alternatives for supplying power and ground to the exemplary media converters.

Figure 8A:
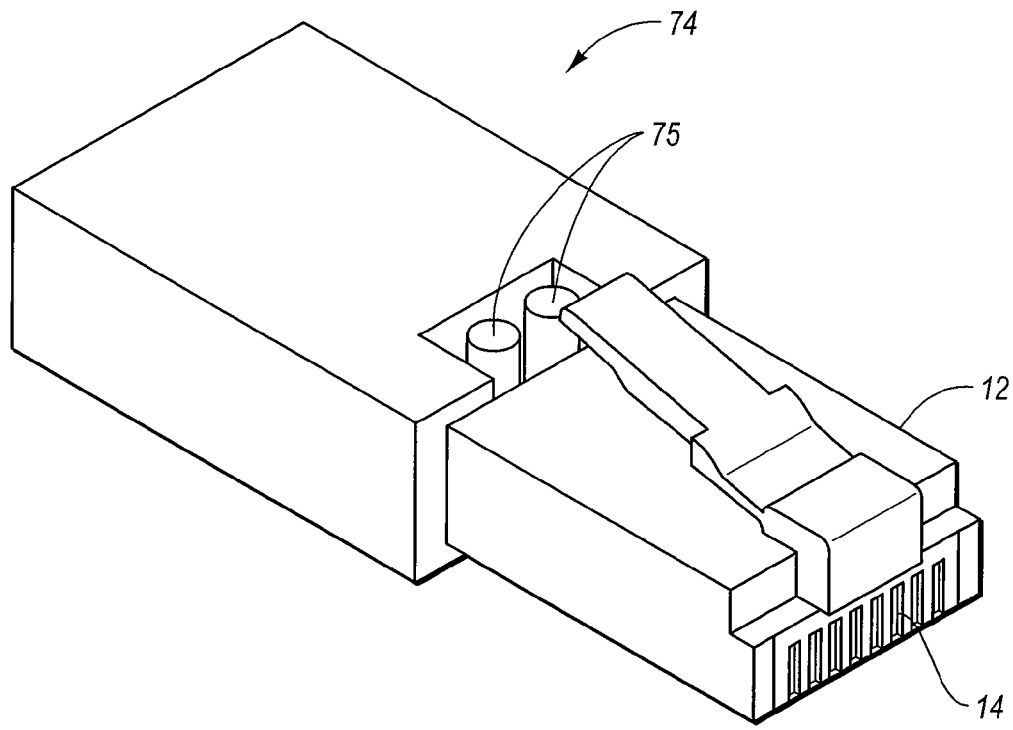
FIGS. 8A, 8B, and 8C illustrate one embodiment of the media converter of FIGS. 2, 3A, and 3B that is configured for drawing power from a power supply that is independent from the RJ-45 electrical jack.
Figure 8B:
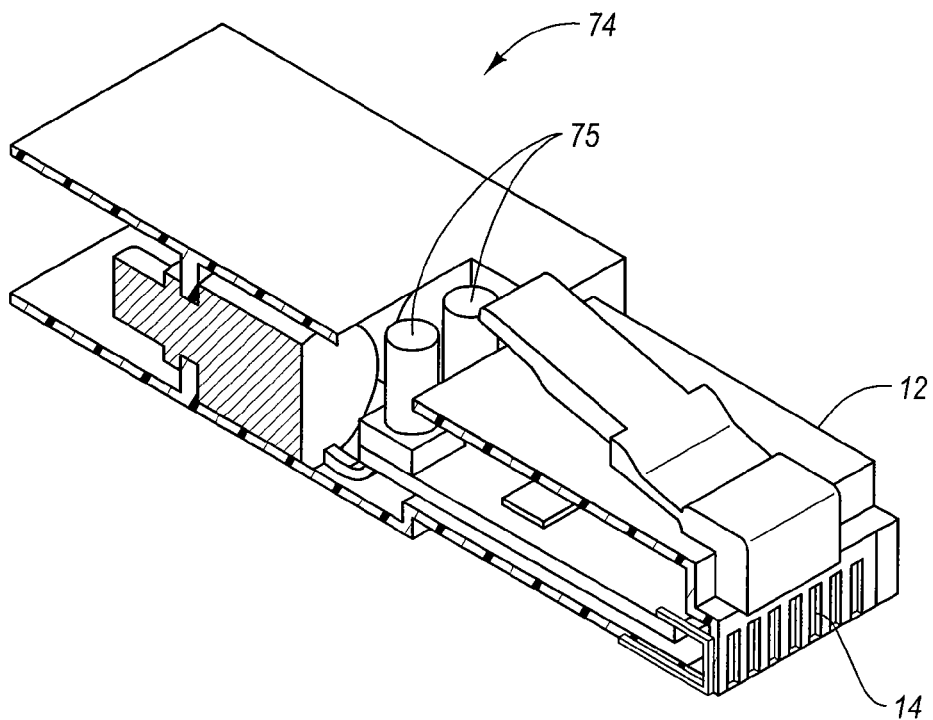
Figure 8C:
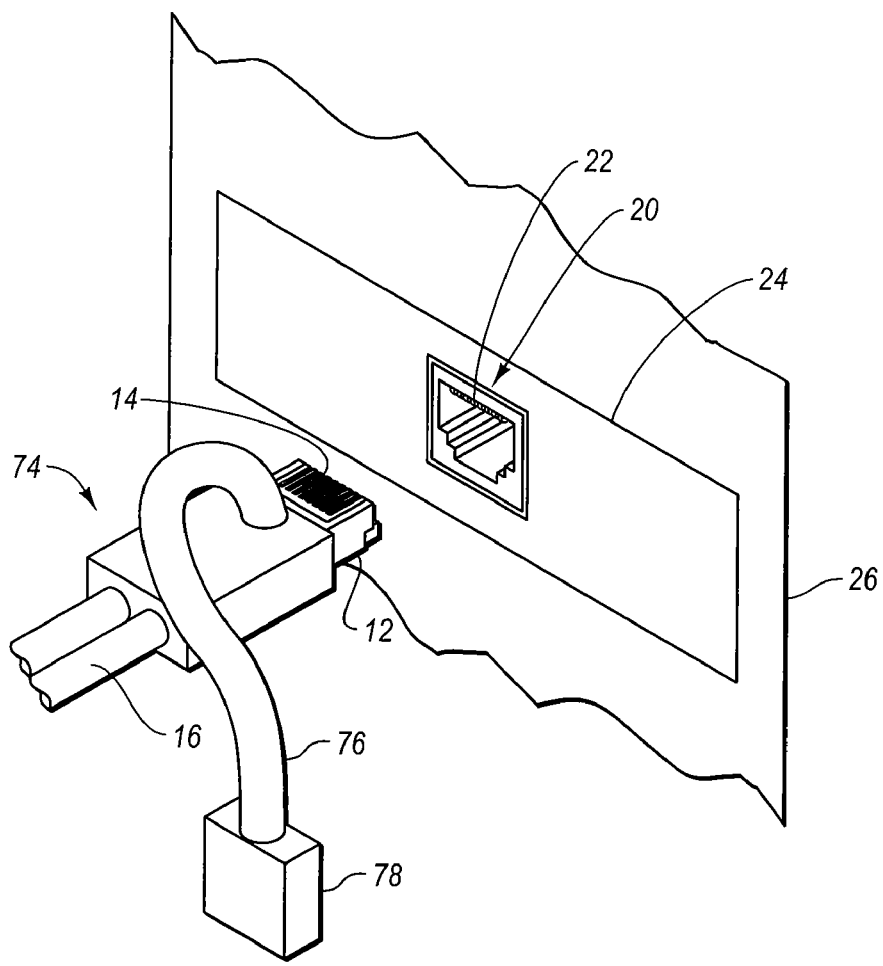

In one embodiment, illustrated in FIGS. 8A, 8B, and 8C, a media converter 74 is configured for drawing power from a power supply (not shown) that is independent from an RJ-45 jack 20. By way of example, media converter 74 can be equipped with a power connector 75. Power connector 75 may be comprised of two pins used for receiving power and ground, as is shown in FIGS. 8A and 8B. As is illustrated in FIG. 8C, a power cord 76 can connect the power connector 75 shown in FIGS. 8A and 8B to a power supply (not shown) that is independent from RJ-45 jack 20. A power plug 78 is mounted on the end of the power cord 76 that is not connected to media converter 74. Power plug 78 can create an electrical coupling to the independent power supply (not shown). Various types of power cords 76 with different power plugs 78 may be employed, depending on the power supply that is used. The power supply may include a number of alternative power sources. Examples include, but are not limited to, a wall socket (120 Volts rms at 60 Hertz), a USB connector (5 Volts DC), or a firewire connector (30 Volts DC). The power cord 76 may be connected to any number of power supplies that are known to one of ordinary skill in the art.

In one embodiment, power cord 76 is detachably connected to media converter 74 through power connector 75. In another embodiment, power cord 76 is permanently attached to media converter 74, optionally through power connector 75.

In many cases, the power that is drawn from the power supply must be regulated, transformed, converted, and/or rectified for use by the media converter. For example, if the media converter requires +3.3 Volts, and power were drawn from a wall socket at 120 Volts (rms) at 60 Hz, then a voltage transformer, a rectifier, a filter, and a voltage regulator would likely be employed to convert the power supply voltage to the required +3.3 Volts. Other embodiments may simply require a DC to DC converter to generate the required 3.3 Volts.

In one embodiment, the required power conversion circuitry is located within media converter 74. In another embodiment, the required circuitry is located external to media converter 74, for example, near the power supply or power plug 78, or located on or along the power cord 76.

In another embodiment and as discussed in more detail herein with reference to FIGS. 11A, 11B, 12A, and 12B, the media converter may be configured for use in an electrical jack that has been preconfigured to supply power and ground to an electrical plug. By employing an electrical jack having conductive pads or pins supplying power and ground, the requirement that the media converter have a separate power cord for supplying power is eliminated. This enables the user to simply plug the media converter into the electrical jack, without being required to plug in a separate power cord in order to supply power to the media converter.

One technique for obtaining power and ground from the electrical jack is through the "IEEE 802.3af" Power Over Ethernet ("PoE") standard. The PoE standard was established for delivering power over CAT-5 lines, and is widely believed to have the potential of becoming a de facto technology for LAN switches. The standard is generally used for 10Base-T and 100Base-T, which utilize two of the four twisted pair lines of a network cable for data transmission, as is illustrated in FIG. 6. The PoE specification provides two options for using the twisted pair cables to deliver a 48 Volt differential. First, the two unused twisted pairs are employed for carrying the voltage differential. Second, the twisted pairs used for transmitting and receiving data are also used for carrying the 48 Volt differential, where a DC voltage is applied to the center tap of the isolation transformer of the two pairs used for data transmission.

Figure 9:
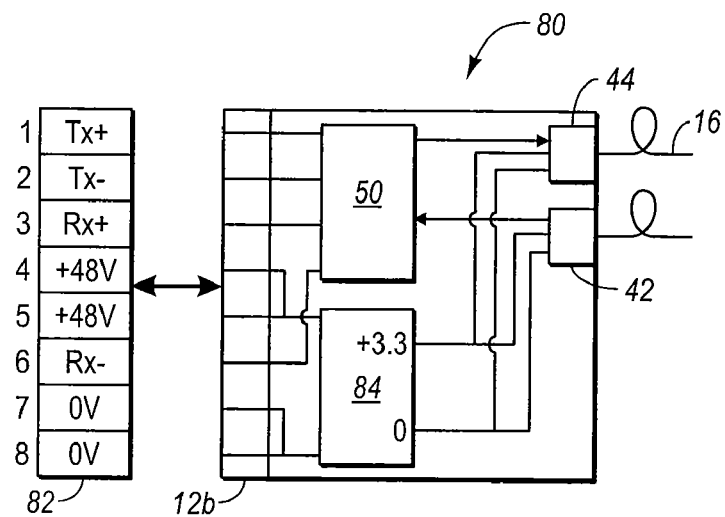
FIG. 9 illustrates an exemplary media converter that is configured to utilize the IEEE 802.3af Power Over Ethernet standard.

FIG. 9 is illustrative of a media converter 80 that is configured to utilize the PoE standard. The media converter 80 simply draws power directly from the conductive pads labeled 4, 5, 7, and 8 of the electrical jack 82 that have been configured for supplying the 48 Volt differential. A DC to DC converter 84 is positioned within the media converter 80 for creating the voltage that is required by optical receiver 42 and optical transmitter 44. In the example media converter of FIG. 9, the DC to DC converter 84 converts a 48 Volt differential to a 3.3 Volt differential.

Figure 10:
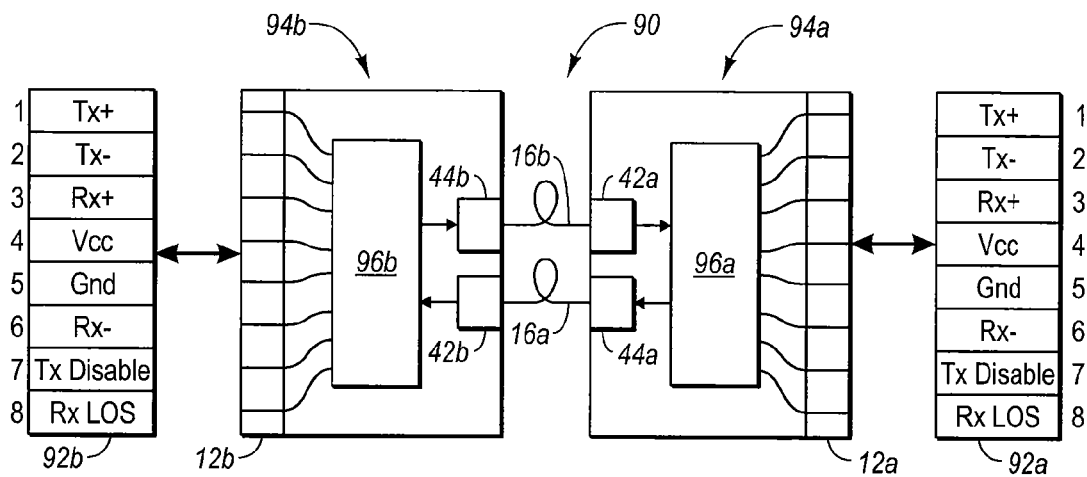
FIG. 10 illustrates another exemplary means for providing power and ground to a media converter.

Alternatively, as illustrated in FIG. 10, a new protocol is provided, wherein an RJ-45 jack provides signals that have been customized for optical transmission. Although numerous such protocols may be developed by one of ordinary skill in the art, FIG. 10 is merely one example of a system 90, wherein the signals provided by RJ-45 jacks 92a and 92b have been customized for use by media converters 94a and 94b, respectively. In this example, the conductive pads of RJ-45 jacks 92a and 92b labeled 1 and 2 are designated as Tx+ and Tx−, respectively, and pins 3 and 6 are labeled Rx+ and Rx−, respectively. Therefore, pins 1, 2, 3, and 6 of RJ-45 jacks 92a and 92b have the same function as their 100Base-T counterparts. However, pin 4 of RJ-45 jacks 92a and 92b has been dedicated for supplying power, and pin 5 has been dedicated for supplying ground to media converters 94a and 94b, respectively. Pin 7 of RJ-45 jacks 92a and 92b provides a Tx Disable (Transfer Disable) signal, and pin 8 supplies an Rx LOS (Receiver Loss) signal. Notably, because the transmit and receive signals in the present embodiment are designated to the same pins as those of a 100Base-T standard, it is possible to connect a standard copper Ethernet network cable into the RJ-45 jacks 92a and 92b. Where a standard copper Ethernet network cable is used, the non-transmission signals, i.e., Vcc, Gnd, Tx Disable, and Rx LOS, are simply unused by the system.

In another embodiment, an electrical jack is disclosed having additional conductive pads supplying power and ground. When used in connection with a media converter, the plug on the media converter is sized and configured having additional conductive pins for connection with the voltage and ground pads of the electrical jack. However, when used in connection with a conventional copper Ethernet cable, the plug on the cable is sized and configured without the additional pins for the power and ground, and thus has the same functionality as a conventional copper wire system.

Figure 11A:
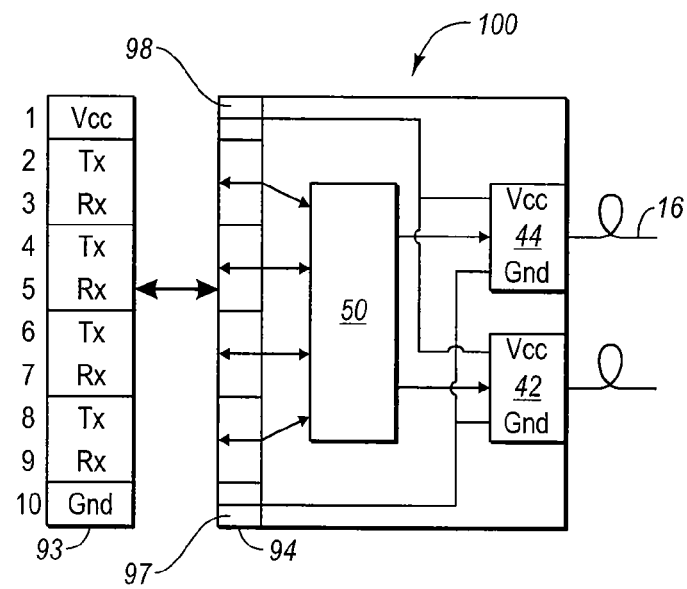
FIGS. 11A and 11B illustrate another exemplary means for providing power and ground to a media converter.
Figure 11B:
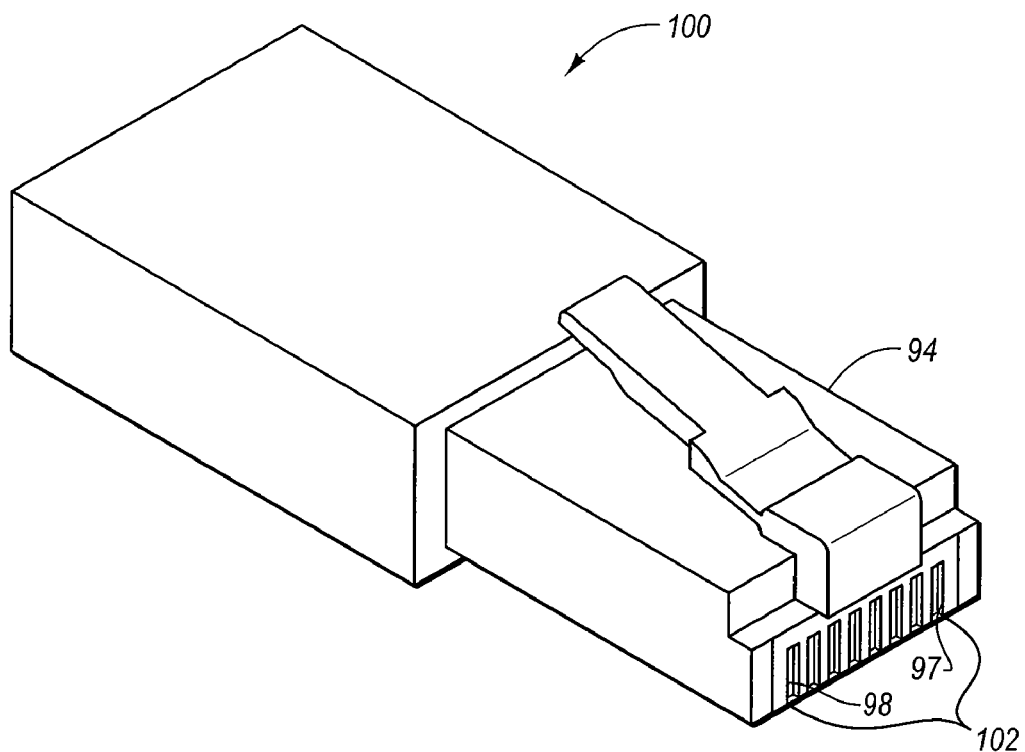

For example, FIGS. 11A and 11B illustrate an electrical jack 93 having ten conductive pads, labeled 1-10. FIG. 11A shows a schematic diagram 100 of the present embodiment, while FIG. 11B is a perspective view of media converter 100 configured to implement the present embodiment. The schematic of FIG. 11A includes electrical jack 93, which is configured for use with a 1000Base-T networking standard, as described above in connection with FIGS. 7A and 7B. In addition to the conventional eight pins for supplying four sets of Tx and Rx signals, electrical jack 93 has two additional conductive pads for supplying power and ground. In one embodiment, as illustrated in FIGS. 11A and 11B, the conductive pads supplying power and ground are placed at the outmost locations of electrical jack 93, labeled 1 and 10 on electrical jack 93. Therefore, electrical jack 93 has ten conductive pads instead of eight, and is slightly wider than a typical RJ-45 jack.

FIGS. 11A and 11B also include a media converter 100, which can be coupled to electrical jack 93 using a plug 94. Plug 94 contains ten conductive pins 102, which can be electrically coupled to the ten conductive pads (labeled 1-10) of electrical jack 93. The outermost pins 97 and 98 may be designated to receive power and ground from the conductive pads labeled 1 and 10 on electrical jack 93. Therefore, plug 94 is also slightly wider than a typical RJ-45 plug, sized to be received by electrical jack 93.

The power and ground supplies are utilized to provide power to various components of media converter 100. The remaining circuitry of plug 94 and media converter 100 may be substantially the same as that of FIG. 7B, wherein the Tx and Rx PAM5 signals are multiplexed and demultiplexed using a unique processor 50.

Where a user does not desire to employ media converter 100, but instead would prefer to employ a conventional copper Ethernet cable, electrical jack 93 may be configured to receive a conventional eight-pin RJ-45 plug. The RJ-45 plug would simply be inserted into the center of electrical jack 93, and the outer power and ground conductive pads labeled 1 and 10 would not be utilized.

Although the embodiment of FIG. 11A shows a 1000Base-T system, the principle of providing additional conductive pads for supplying power and ground voltage is also applicable for other electrical jacks and networking standards such as, for example, 100Base-T.

Figure 12A:
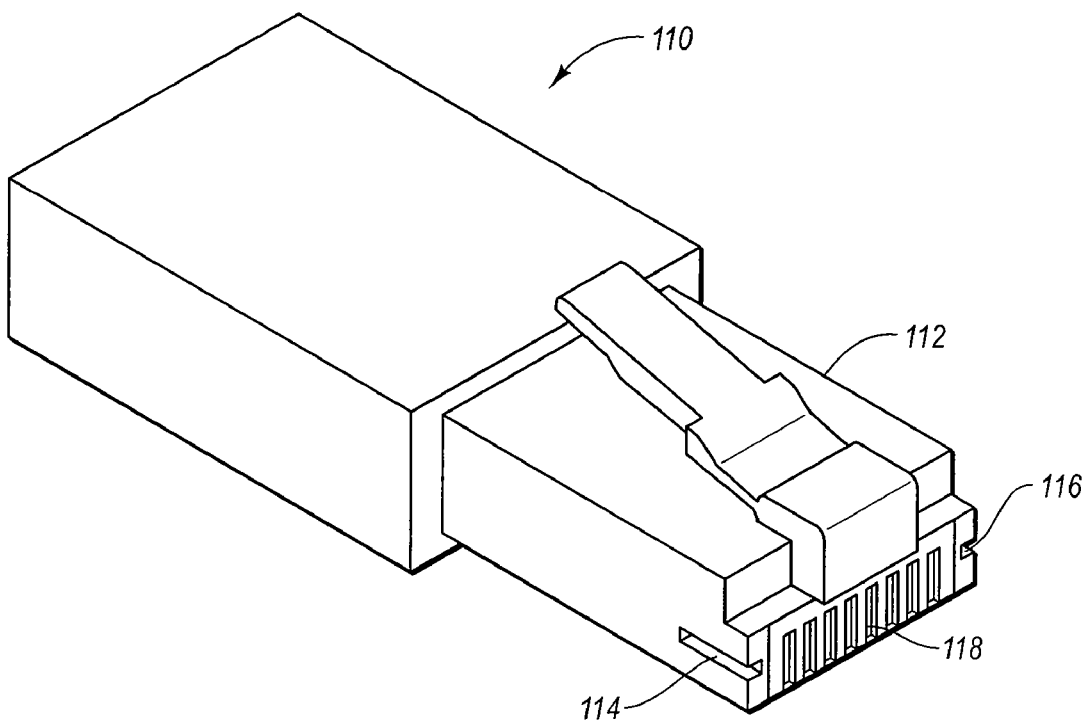
FIGS. 12A and 12B illustrate another exemplary means for providing power and ground to a media converter that includes optical ports instead of being attached to an optical cable.
Figure 12B:
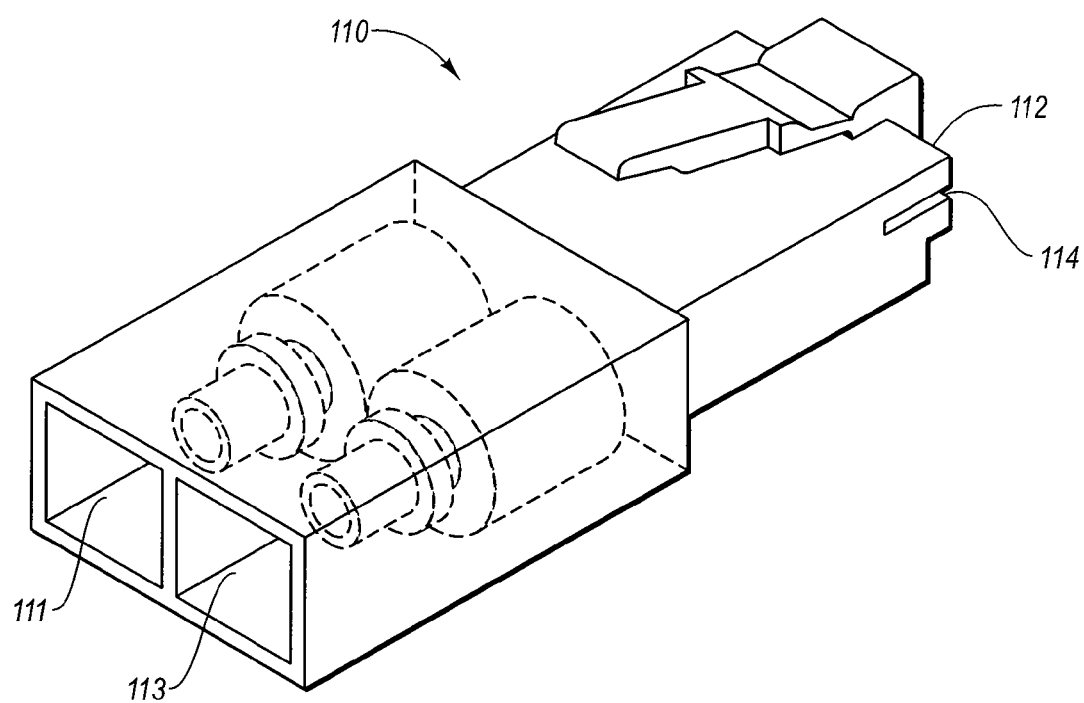

FIGS. 12A and 12B illustrate another embodiment for providing power and ground to a media converter 110. In this embodiment, additional side pins 114 and 116 are provided on a plug 112 for receiving power and ground from an electrical jack (not shown). The electrical jack (not shown) is configured to have corresponding additional side power and ground pads. When plug 112 of media converter 110 is inserted into the electrical jack (not shown), the side pins 114 and 116 are electrically coupled to the corresponding additional side power and ground pads of the electrical jack (not shown). Because the additional side pins 114 and 116 are located on the sides of plug 112, plug 112 is not required to be widened, as was the case in the embodiment of FIGS. 11A-11C. Therefore, although additional pins are included for supplying power and ground, a larger electrical jack is not required, and thus, jack density on the host equipment is maintained. Furthermore, because the sides of conventional electrical jacks and plugs are usually made from non-conductive plastic, the two additional side pads of the electrical jack do not prohibit the use of a standard network cable.

3. EXEMPLARY MEDIA CONVERTER CONFIGURATIONS

FIGS. 12A and 12B also illustrate another feature of one embodiment of the present invention. Media converter 110 does not include a permanently attached optical cable or cables. Media converter 110 includes optical ports 111 and 113 for coupling optical cables to the media converter, as illustrated more particularly in FIG. 12B. Because the media converter does not have a permanently attached optical cable, the user is required to connect an optical cable to optical ports 111 and 113 of media converter 110. The term "optical port" as used herein refers to a port configured to receive an optical cable or optical port connector. Examples of optical ports include, but are not limited to, optical ports compliant with MU, LC, SC, MT-RJ standards. The term optical port as used herein is not limited to a port having a single port opening, but broadly encompasses a port having one or more port openings. For example, an optical port can comprise an optical receive port and an optical transmit port. An optical port configured according to this example can be configured to receive a first optical transmission channel of an optical cable in the optical receive port and a second optical transmission channel of an optical cable in the optical transmit port.

In other embodiments disclosed herein and illustrated in FIGS. 2 and 8C, a media converter is coupled to at least one optical cable. Hence, a first end of the optical cable is coupled to the media converter, and the second end of the optical cable is unattached, or open-ended. The unattached end of the optical cable may be connected to hardware that is preconfigured for optical transmission. For example, the unattached end of the optical cable may be plugged directly into an existing Ethernet compliant optical port that anticipates serial encoded optical data.

In another embodiment, the invention is comprised of at least one optical cable, a first media converter that is optically coupled to a first end of at least one optical cable, and a second media converter that is optically coupled to a second end of the at least one optical cable. This embodiment is meant to replace an entire electrical cable having electrical plugs at each end. The two media converters are simply plugged into two compliant electrical jacks. Interconnecting the two electrical jacks with the present embodiment creates optical transmission between the two electrical jacks, instead of electrical transmission through a conventional electrical cable.

4. EXEMPLARY WALL-MOUNTABLE MEDIA CONVERTERS

Figure 13A:
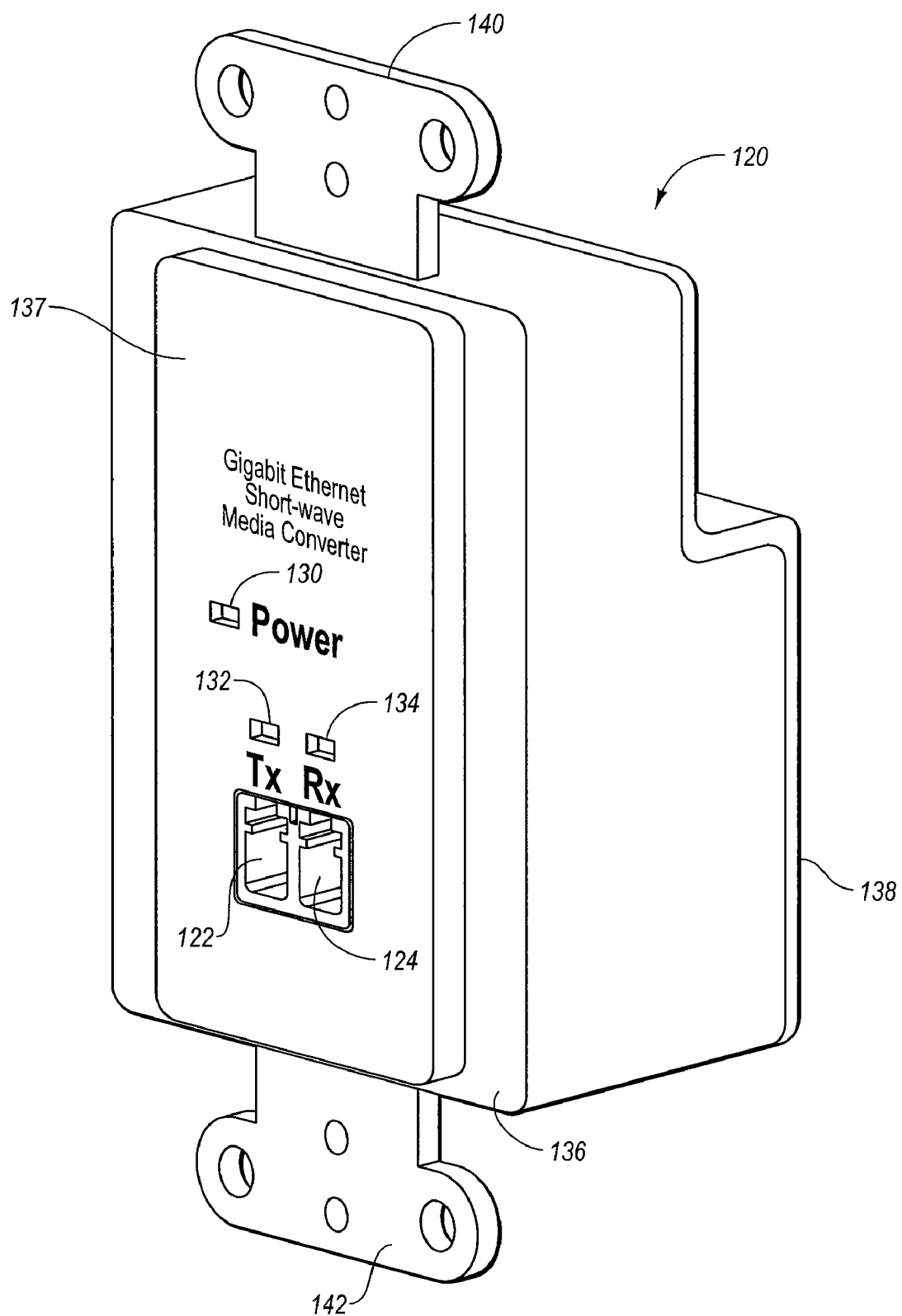
FIGS. 13A and 13B illustrate a perspective front view and a perspective back view of an exemplary wall-mountable media converter according to one embodiment the present invention.
Figure 13B:
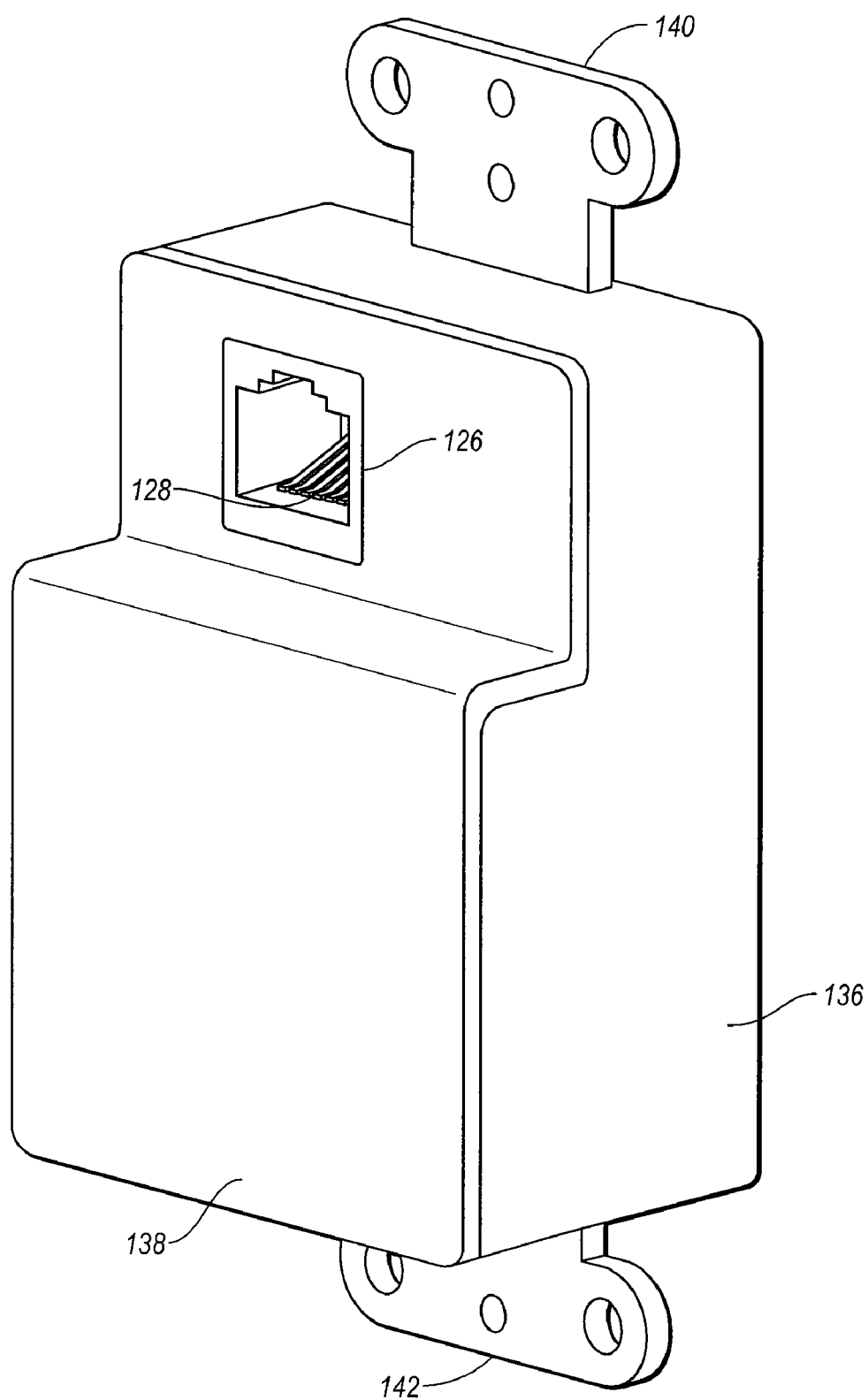

Turning now to FIGS. 13A and 13B, perspective front and back views of a wall-mountable embodiment of a media converter 120 is illustrated. The outer housing of media converter 120 has a form-factor which is configured to be mounted in a standard wall outlet box, such as the standard wall outlet box illustrated and discussed below in connection with FIG. 16. Standard wall outlet boxes are well known in the art and are used for such things as electrical outlets, light switches, telephone ports, and Ethernet jacks. The form factor of media converter 120 allows it to be easily installed in a wall outlet box, which can in turn be installed in a permanent location. Media converter 120 can be configured to convert between Gigabit Ethernet signals and gigabit optical signals, as described in connection with FIG. 7B.

Media converter 120 includes optical transmit port 122 and optical receive port 124. Ports 122 and 124 are illustrated as LC ports, but media converter 120 is not limited to LC ports and could include other types of optical ports in place of ports 122 and 124. Ports 122 and 124 are configured to receive cables, such as optical cables 16a and 16b illustrated in FIG. 4. Media converter 120 also includes an electrical jack 126. Electrical jack 126 is illustrated as an RJ-45 jack, but media converter 120 is not limited to an RJ-45 electrical jack and could include another type of electrical jack in place of electrical jack 126. Electrical jack 126 includes a plurality of conductive pins 128 that are sized and configured to be electrically coupled to the conductive pins of the electrical plug of a conventional electrical cable, such as the conductive pins 31 of electrical plug 30 of electrical cable 32 as illustrated in FIG. 1.

Media converter 120 also includes several means for visually ascertaining certain functions of media converter 120. Media converter includes light-emitting diodes ("LEDs") 130, 132, and 134. LEDs 130, 132, and 134 enable a user to visually ascertain the status of certain functions of media converter 120. LED 130 is illuminated when media converter 120 is connected to a power source. LED 132 is illuminated when media converter 120 is transmitting a data signal through port 122. LED 134 is illuminated when media converter 120 is receiving a data signal through port 124. LEDs 130, 132, and 134 can be replaced with other types of visual displays, such as digital readouts, that enable a user to visually ascertaining the status of certain functions of media converter 120

Media converter 120 further includes a front housing 136 that encloses the front, top, sides, and bottom of media converter 120. Media converter 120 also includes a back housing 138 which is configured to mate with front housing 136 and enclose the back of media converter 120. Media converter 120 also includes mounting brackets 140 and 142 which are configured to mate with a standard wall outlet box, similar to the outlet box illustrated in FIG. 16. Mounting brackets 140 and 142 are used to mount media converter 120 into a standard wall outlet box and thereby affix media converter 120 in a permanent location.

When media converter 120 is operably mounted within a wall outlet box, a face 137 of front housing 136 is at least partially exposed to view, such that a portion of face 137 is visible to a user. Specifically, the portion of face 127 in which LEDs 130, 132, and 134 and jacks 122 and 124 are disposed is visible to a user when media converter 120 is operably mounted within a wall outlet box. Although optical transmit port 122 and optical receive port 124 are illustrated on front housing 136 and electrical jack 126 is illustrated on back housing 138 in FIGS. 13A and 13B, or configurations are possible. For example, optical transmit port 122 and optical receive port 124 can be located on back housing 128 and electrical jack 126 can be located on face 137 of front housing 136, in which case electrical jack 126 would be visible to a user when media converter 120 is operably mounted within a wall outlet box. In another example configuration, optical transmit port 122 and optical receive port 124 and electrical jack 126 can be located on face 137 of front housing 136, in which case optical transmit port 122, optical receive port 124 and electrical jack 126 would be visible to a user when media converter 120 is operably mounted within a wall outlet box.

FIGS. 13A and 13B illustrate an embodiment of a where the media converter 120 is mounted within a wall outlet box or is configured as a wall outlet box where the optical ports are accessible to users and the electrical jack 126 is disposed within the wall. In an alternative embodiment, the optical ports 122 and 124 and the electrical jack 126 can be reversed such that the electrical jack is accessible to users and the optical ports 122 and 124 are disposed inside the wall. This accounts for situations where the infrastructure is optical in nature. When the electrical jack is accessible to the user, it may be the case that the connecting device may supply the power needed by the media converter 120.

Figure 14:
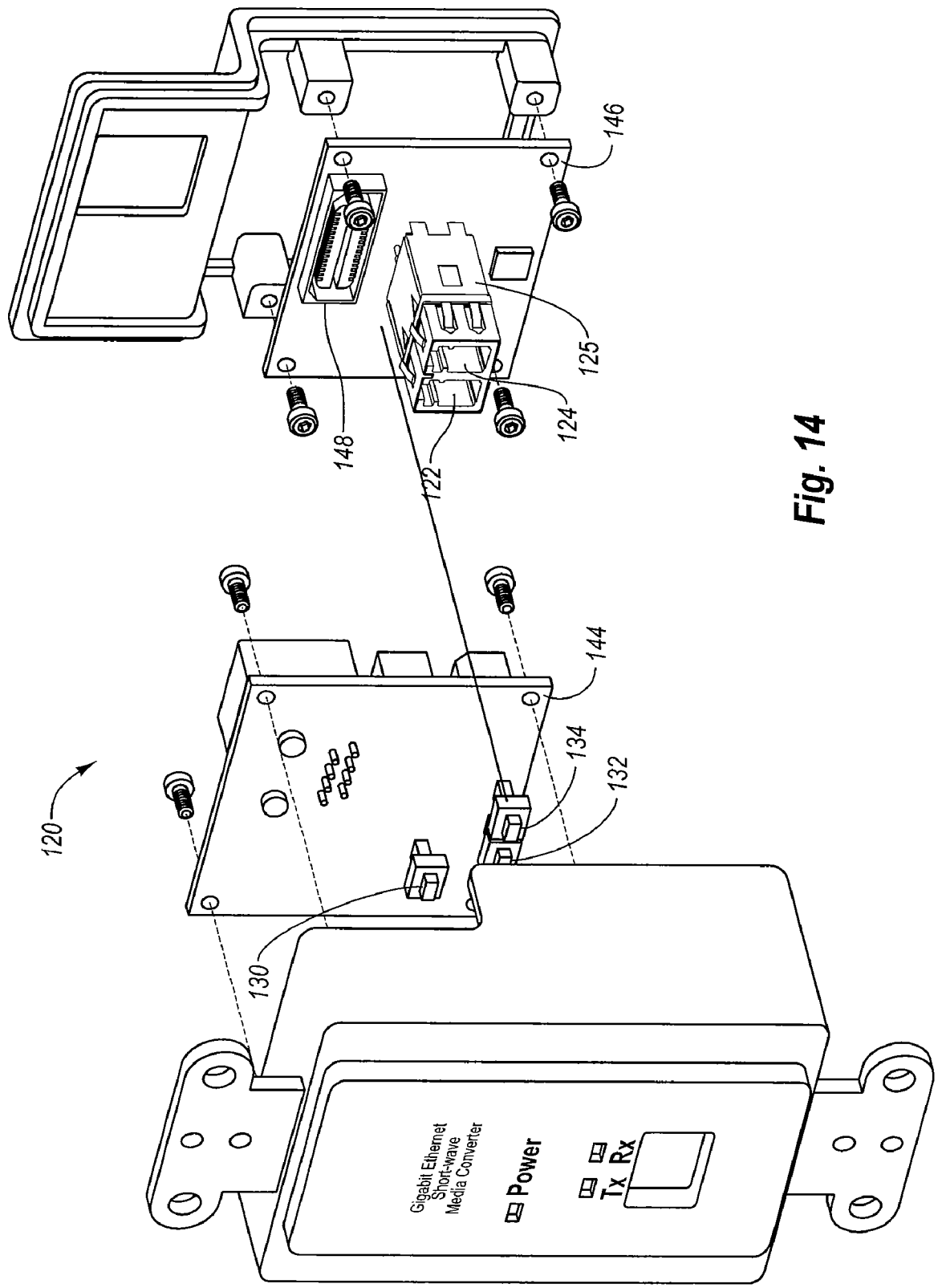
FIG. 14 illustrates an exploded perspective front view of the exemplary wall-mountable media converter of FIGS. 13A and 13B.

Turning now to FIG. 14 an exploded perspective front view of the media converter 120 of FIGS. 13A and 13B is illustrated. Media converter 120 includes printed circuit boards ("PCBs") 144 and 146. The side of PCB 144 visible in FIG. 14 includes LEDs 130, 132, and 134. The side of PCB 146 visible in FIG. 14 includes optical transmit port 122 and optical receive port 124, as well as PCB connector 148. Transmit port 122 and receive port 124 are included in an optical transceiver module 125. Optical transceiver module 125, in combination with PCBs 144 and 146 and electrical jack 126, can include circuitry similar to the circuitry illustrated and described in connection with FIG. 4.

Figure 15A:
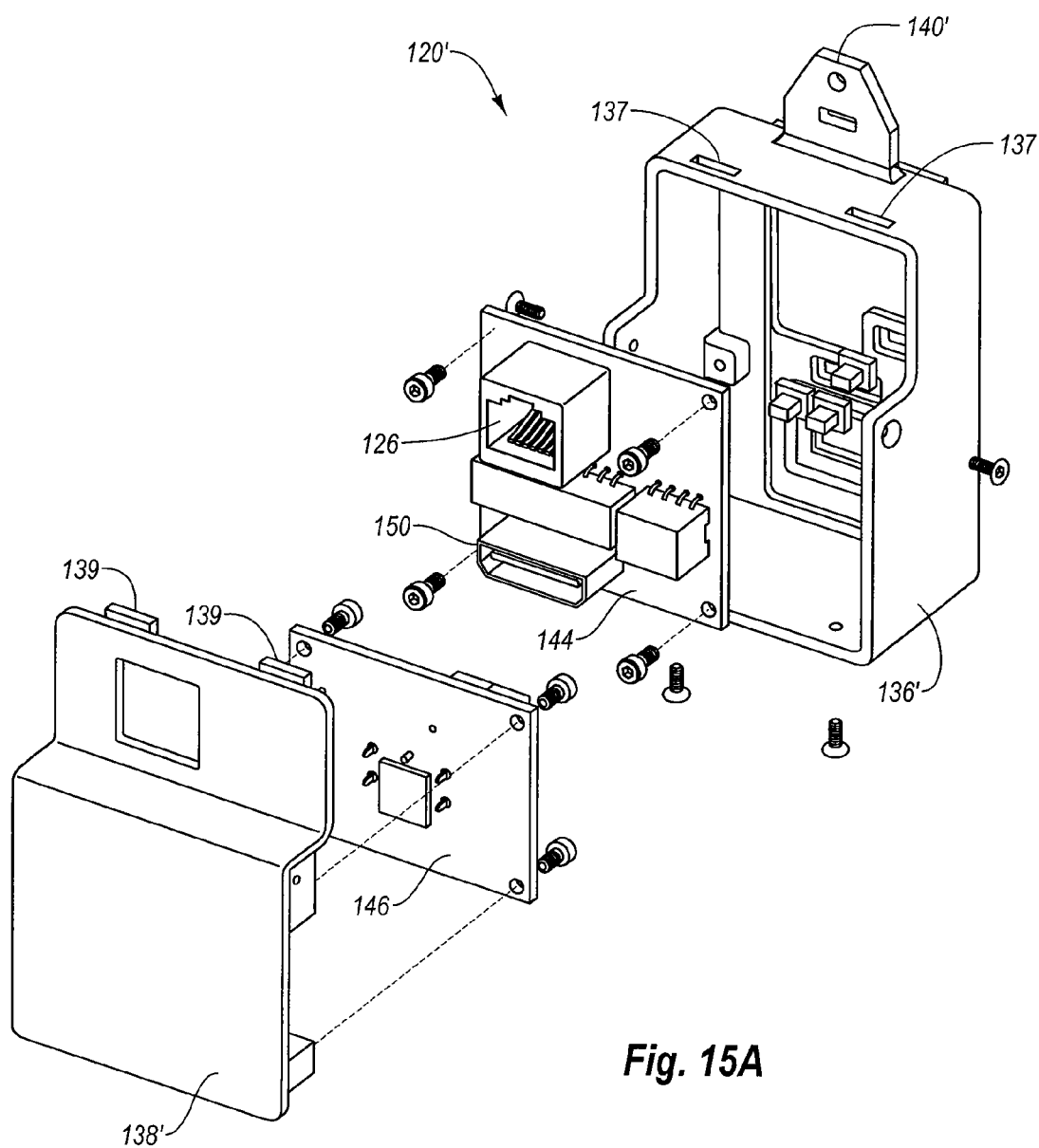
FIG. 15A illustrates an exploded perspective back view of a variation of the exemplary wall-mountable media converter of FIGS. 13A and 13B.
Figure 15B:
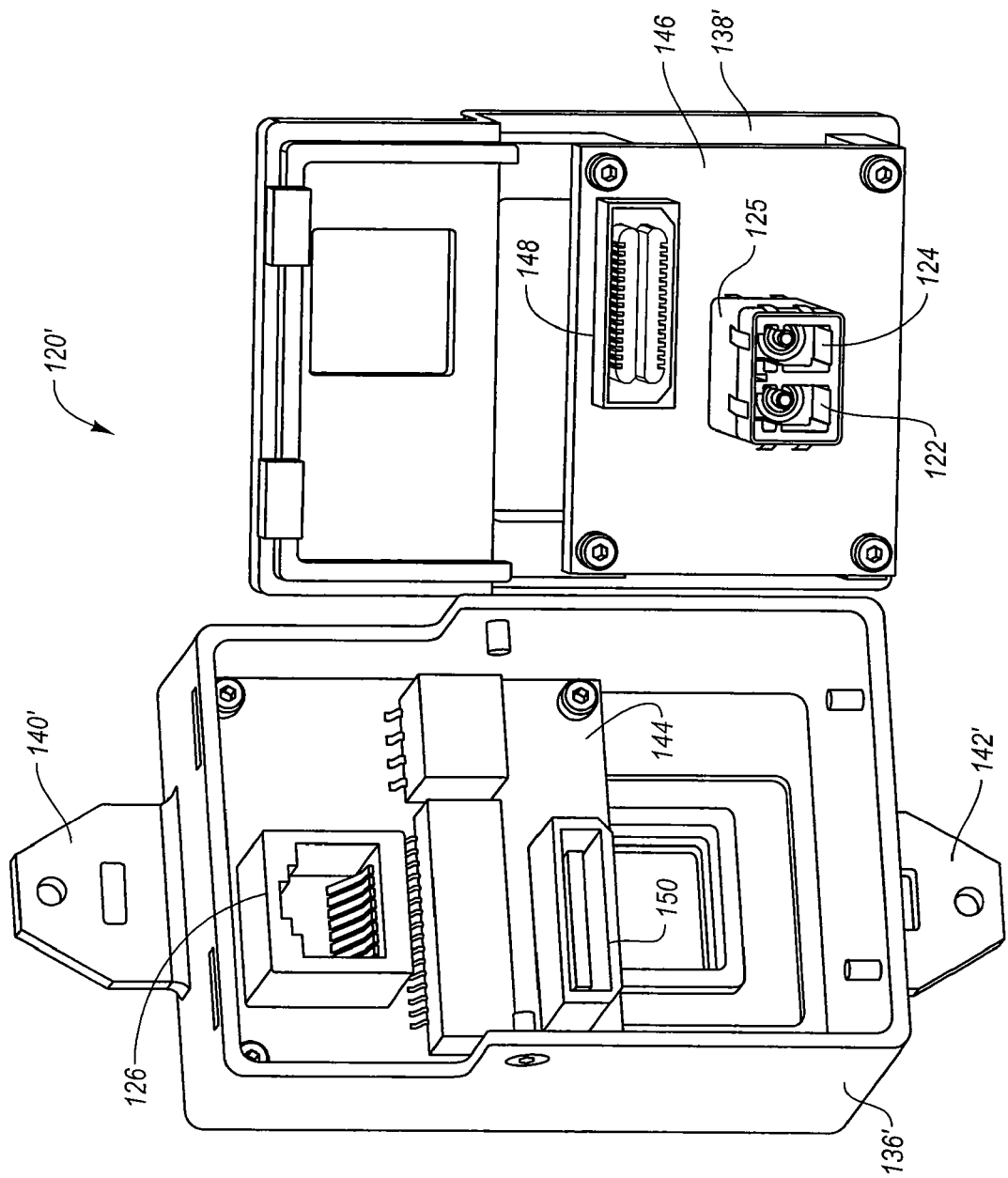
FIG. 15B illustrates a perspective inside view the exemplary wall-mountable media converter of FIG. 15A.

Turning now to FIGS. 15A and 15B, an exploded perspective back view and a perspective inside view of a variation of the media converter 120 (labeled 120') of FIGS. 13A and 13B is illustrated. Media converter 120' is identical to media converter 120 internally, but differs externally. A front housing 136' of media converter 120' includes slots 137 which correspond to tabs 139 of a back housing 138'. Tabs 139 are configured to be inserted into slots 137 when back housing 138' is coupled to and mated with front housing 136'. Mounting brackets 140' and 142' are shaped differently from mounting brackets 140 and 142, but are still configured to enable media converter 120' to be mounted into a standard wall outlet box and thereby permanently affix media converter 120' into a fixed location.

The side of PCB 144 visible in FIG. 15A includes electrical jack 126 as well as PCB connector 150. PCB connector 148 on PCB 146 and PCB connector 150 on PCB 144 are aligned within both media converter 120 and media converter 120' to mate with each other and thereby establish electrical communication between PCB 144 and PCB 146. PCB 144 and PCB 146, in combination with optical transceiver module 125 and electrical jack 126, also include circuitry configured to convert between Gigabit Ethernet and gigabit fiber optic communications, as described above in connection with FIG. 7B. FIG. 15B shows PCB 144 mounted within back housing 136' and PCB 146 mounted within back housing 138'.

The internal circuitry of both wall-mountable media converters 120 and 120' are configured similar to the circuitry illustrated and described in connection with FIG. 7B. Specifically, media converters 120 and 120' are configured to enable Gigabit Ethernet conversion. Likewise, media converters 120 and 120' can be configured to be powered according to the Power over Ethernet standard described above in connection with FIG. 9. Alternatively, media converters 120 and 120' can be configured to be powered according to any of the power designs illustrated and described in connections with FIGS. 8A-8C, 10, 11, or 12A or 12B, or any other power scheme or combination of power schemes disclosed herein or known in the art. Therefore, the wall-mounted media converters 120 and 120' can be configured to accomplish Gigabit Ethernet conversion with or without an external power source.

Figure 16:
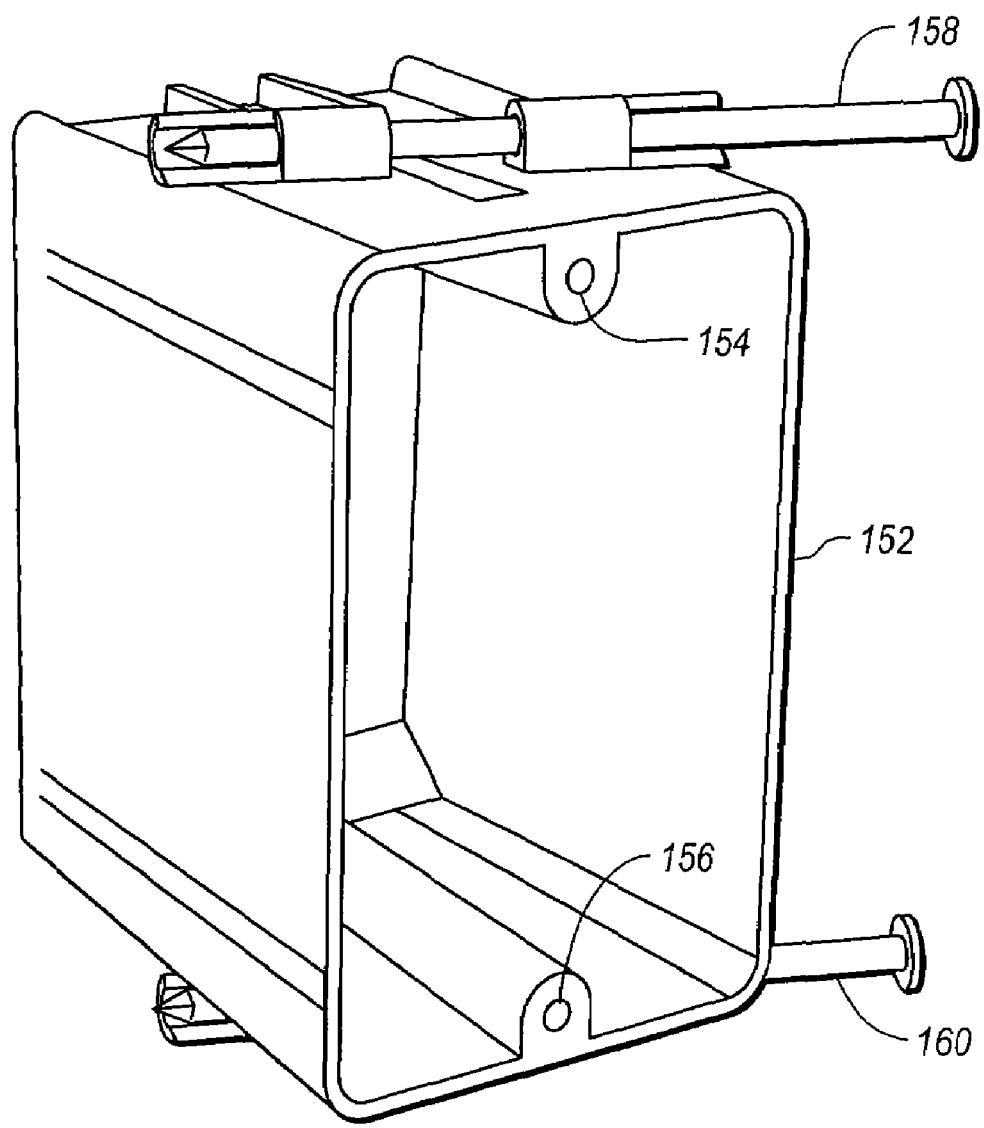
FIG. 16 illustrates a standard wall outlet box.

Turning finally to FIG. 16, a standard wall outlet box 152 is illustrated. Wall outlet box 152 includes holes 154 and 156 which align exactly with mounting brackets 140 and 142 or 140' and 142' when media converter 120 or media converter 120' is disposed within outlet box 152. A screw or other connecting device (not shown) can then be used to securely attach media converter 120 or media converter 120' to outlet box 152. Outlet box also includes screws or nails 158 and 160 which are used to securely attach outlet box 152 to a wall stud, thereby enabling the secure affixing of outlet box 152 to an internal stud of a wall. When wall outlet box 152 is mounted to an internal stud of a wall, the front opening of wall outlet box is generally positioned so as to be substantially flush with the surface of the wall. Likewise, when media converters 120 or 120' are mounted within wall outlet box 152, face 137 of front housing 136 is generally positioned so as to be substantially flush with the surface of the wall. Media converters 120 or 120' therefore take up a negligible amount of the usable space in a room when mounted since the majority of the volume occupied by media converters 120 or 120' is positioned within a wall of the room.

Accordingly, the principles of the present invention disclosed herein relate to a media converter for use in electrical-to-optical or optical-to-electrical conversion. The present invention provides many advantages in the field of computer networks. The invention is particularly advantageous in the field of Storage Area Networks ("SANs"), and their interconnections to Local Area Networks ("LANs") and Wide Area Networks ("WANs"). A SAN is a subnetwork of shared storage devices, often characterized by its high interconnection data rates. Because of the high data speeds in a SAN, electromagnetic interference ("EMI") often becomes a problem, particularly where the lengths of copper network cables carrying electrical signals extend for long distances, for example, over 10 meters, and where data transmission speeds increase, for example, as with 1000Base-T. However, where copper electrical cables are replaced with fiber optical cables, the threat of EMI is eliminated, because optical transmissions are not affected by EMI. Although ordinarily replacing electrical cables with optical cables can be expensive where the networking hardware integrated into the SAN, LAN, and WAN is preconfigured to be interconnected with copper electrical cables, the exemplary embodiments of the media converter of the present invention can drastically reduce this expense by enabling copper electrical cables to be replaced with fiber optical cables without changing the integrated networking hardware.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A media converter comprising:
  a housing;
  an optical transmit port and an optical receive port disposed on one end of the housing;
  an electrical plug disposed on the housing comprising:
    a first pin dedicated for transmitting a first electrical signal;
    a second pin dedicated for receiving a second electrical signal; and
    a third pin associated with at least one of a TxD signal and a RxLOS signal; and
  circuitry configured to convert a third electrical signal received by the optical receive port into the first electrical signal and to convert the second electrical signal into a fourth electrical signal transmitted by the optical transmit port.

2. The media converter as recited in claim 1, wherein the electrical plug is RJ-45 compliant.

3. The media converter as recited in claim 1, wherein the electrical plug comprises a fourth pin through which the circuitry is configured to receive power.

4. The media converter as recited in claim 3, wherein the third pin is dedicated for receiving the transfer disable signal, the electrical plug further comprising a fifth pin dedicated for receiving the receiver loss signal, and
  wherein the fourth and fifth pins are positioned at a first end of the electrical plug and the first, second, and fourth pins are positioned at a second end opposite to the first end of the electrical plug.

5. The media converter as recited in claim 1, wherein:
  the circuitry is configured to receive the second electrical signal from the electrical plug at gigabit speeds, convert a first format of the second electrical signal to a second format of the fourth electrical signal, and output the fourth electrical signal to the optical transmit port at gigabit speeds; and
  the circuitry is configured to receive the third electrical signal from the optical receive port at gigabit speeds, convert the second format of the third optical signal to the first format of the first electrical signal, and output the first electrical signal to the electrical plug at gigabit speeds.

6. The media converter as recited in claim 1, wherein the electrical plug further comprises:
  a fourth pin dedicated for receiving power;
  a fifth pin dedicated for receiving ground;
  a sixth pin dedicated for transmitting a signal opposite in polarity to the first electrical signal;
  a seventh pin dedicated for receiving a signal opposite in polarity to the second electrical signal; and
  an eight pin associated with the TxD signal, wherein the third pin is associated with the RxLOS signal.

7. The media converter as recited in claim 1, wherein the circuitry is configured to convert electrical signals having a first format that complies with an electrical standard to a second format that complies with an optical standard.

8. The media converter as recited in claim 1, further comprising:
  an optical cable disposed on a second end of the housing;
  an optical transmitter disposed within the housing and optically connected with the optical cable;
  an optical receiver disposed within the housing and optically connected with the optical cable;
  wherein the circuitry connects to the electrical plug, the optical transmitter, and the optical receiver, the circuitry being configured to receive electrical signals from the electrical plug and to output corresponding electrical signals to the optical transmitter, the circuitry also being configured to receive electrical signals from the optical receiver and to output corresponding electrical signals to the electrical plug.

9. The media converter as recited in claim 8, wherein the third electrical signal is received by the optical receive port as an optical signal and is converted into the third electrical signal by the optical receiver.

10. The media converter as recited in claim 8, wherein the fourth electrical signal is converted into an optical signal by the optical transmitter for transmission to the optical cable.

11. The media converter as recited in claim 8, wherein the optical receiver acts as an opto-electric transducer by transforming the third electrical signal from an optical form into the electrical form and the optical transmitter acts as an electro-optical transducer by transforming the fourth electrical signal into an optical signal.

12. The media converter as recited in claim 8, further comprising a post amplifier electrically connected to the optical receiver and a laser driver electrically connected to the optical transmitter.

13. The media converter as recited in claim 8, wherein the optical receiver includes a photodiode and the optical transmitter includes a laser, a VCSEL, and/or an LED.

14. The media converter as recited in claim 8, further comprising a power connector at least partially positioned in the housing and configured to interface with a second power supply that is independent from the electrical plug, the power connector being electrically connected to the circuitry.

15. The media converter as recited in claim 8, wherein the optical cable includes at least one of a single mode fiber optic cable, a multimode fiber optic cable and/or a plastic optical fiber optic cable.

16. The media converter as recited in claim 8, wherein the optical cable is permanently attached to an optical port of the media converter.

17. The media converter as recited in claim 8, wherein the optical cable is not permanently attached to an optical port of the media converter.

18. The media converter as recited in claim 17, wherein the optical ports include a MU, LC, SC, and/or MT-RJ optical cable connector.

19. The media converter as recited in claim 1, wherein the media converter further comprises an alternating current to direct current converter electrically connected to the power connector.

20. The media converter as recited in claim 19, wherein the alternating current to direct current converter is disposed inside the housing.

21. The media converter as recited in claim 19, wherein the alternating current to direct current converter is disposed outside the housing.

22. The media converter as recited in claim 1, wherein the electrical plug is RJ-11, RJ-14, RJ-25, RJ-48, RJ-61 and/or RJ-45 compliant.

23. The media converter as recited in claim 1, wherein electrical signals received by the electrical plug include electrical signals of opposite polarities.

24. The media converter as recited in claim 23, wherein the electrical signals of opposite polarities include both Transmit+ ("Tx+") and Transmit− ("Tx−") of opposite polarities.

25. The media converter as recited in claim 23, wherein the electrical signals of opposite polarities include both Receive+ ("Rx+") and Receive− ("Rx−") of opposite polarities.

26. The media converter as recited in claim 1, wherein the electrical signals include multiple data bits in parallel.

27. The media converter as recited in claim 1, wherein the circuitry is further configured to multiplex signals prior to transmission by the optical transmit port.

28. The media converter as recited in claim 1, wherein the circuitry is further configured to demultiplex signals received by the optical receive port.

29. The media converter as recited in claim 1, wherein the circuitry includes a single chip or multiple chips.

30. The media converter as recited in claim 1, further comprising a wall mount for mounting the media converter to a wall.

31. The media converter as recited in claim 5, wherein the first format is associated with an electrical data transmission protocol and the second format is associated with an optical data transmission protocol.

32. The media converter as recited in claim 31, wherein the electrical data transmission protocol includes a Gigabit Ethernet protocol.

33. A system comprising:
  two media converters as recited in claim 1, a first of the media converters disposed at a first end of an optical cable and a second of the media converters disposed at a second end of the optical cable.

34. A system as recited in claim 33, wherein the two media converters are permanently attached to the ends of the optical cable.

35. A system as recited in claim 33, wherein the system further comprises two optical cables, a first of the optical cables coupling the receive port of the first of the media converters with the transmit port of the second of the media converters, and a second of the optical cables coupling the transmit port of the first of the media converters with the receive port of the second of the media converters.

36. A network comprising a media converter as recited in claim 1 connected to a storage device.

* * * * *

UNITED STATES PATENT AND TRADEMARK OFFICE
CERTIFICATE OF CORRECTION

PATENT NO. : 7,331,819 B2
APPLICATION NO. : 11/382457
DATED : February 19, 2008
INVENTOR(S) : Nelson et al.

It is certified that error appears in the above-identified patent and that said Letters Patent is hereby corrected as shown below:

Title Page
(60) Related U.S. Application Data, change both instances of "No." to --no.--

Page Two
(56) OTHER PUBLICATIONS, change "http://www.sandia.gove/media/NewsRel/NR2000/laser.htm" to --http://www.sandia.gov/mediaNewsRel/NR2000/laser.htm--

Drawings
Sheet 13, replace Figure 15A with the figure depicted herein below, wherein both instances of "137" have been changed to --131--

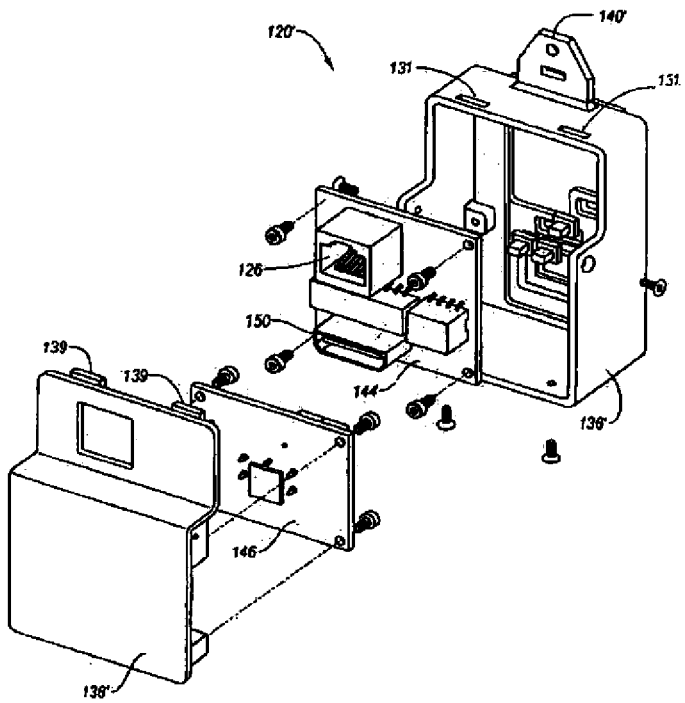

Signed and Sealed this
Fifteenth Day of May, 2012

David J. Kappos
Director of the United States Patent and Trademark Office

Column 1
Line 30, remove "instead"

Column 3
Line 39, change "view the" to --view of the--

Column 4
Line 42, remove "fiber"

Column 5
Line 16, change "data into" to --data signals into--

Column 7
Line 27, change "signal" to --signals--
Line 40, change "signal" to --signals--

Column 8
Line 29, change "(rms)" to --rms--
Line 62, change "48" to --48--

Column 9
Line 5, change "48" to --48--

Column 10
Line 39, change "11A-11C" to --11A-11B--

Column 12
Line 3, change "ascertaining" to --ascertain--
Line 19, change "127" to --137--
Line 20, change "jacks" to --ports--
Line 25, change "or" to --other--
Line 27, change "128" to --138--
Line 67, change "137" to --131--

Column 13
Line 2, change "137" to --131--
Line 20, change "back" to --front--
Line 32, change "connections" to --connection--
Line 50, change "box" to --box 152--

Column 14
Claim 4, line 56, change "fourth" to --third--
Claim 5, line 67, change "optical" to --electrical--

Column 15
Claim 6, line 12, change "eight" to --eighth--